United States Patent
Motoyoshi et al.

(10) Patent No.: US 11,318,608 B2
(45) Date of Patent: May 3, 2022

(54) CONTROL DEVICE AND ROBOT SYSTEM

(71) Applicant: Seiko Epson Corporation, Tokyo (JP)

(72) Inventors: Masaki Motoyoshi, Azumino (JP); Hiroki Adachi, Matsumoto (JP); Yoshihito Yamada, Chino (JP)

(73) Assignee: Seiko Epson Corporation

( * ) Notice: Subject to any disclaimer, the term of this patent is extended or adjusted under 35 U.S.C. 154(b) by 296 days.

(21) Appl. No.: 16/417,790

(22) Filed: May 21, 2019

(65) Prior Publication Data

US 2019/0358812 A1 Nov. 28, 2019

(30) Foreign Application Priority Data

May 22, 2018 (JP) .............................. JP2018-097489

(51) Int. Cl.
*B25J 9/16* (2006.01)
*B25J 13/08* (2006.01)
*G05B 19/423* (2006.01)
*B25J 9/00* (2006.01)

(52) U.S. Cl.
CPC ............. *B25J 9/1633* (2013.01); *B25J 9/161* (2013.01); *B25J 9/1612* (2013.01); *B25J 13/085* (2013.01); *G05B 19/423* (2013.01); *B25J 9/0081* (2013.01)

(58) Field of Classification Search
CPC ...... B25J 9/1633; B25J 13/085; B25J 9/0081; B25J 9/1612; B25J 9/161; G05B 19/423; G05B 2219/36457; G05B 2219/36433; G05B 2219/39319; A61B 34/03; A61B 2090/064; A61B 2090/066
See application file for complete search history.

(56) References Cited

U.S. PATENT DOCUMENTS

| | | | |
|---|---|---|---|
| 5,363,474 A | 11/1994 | Sarugaku et al. | |
| 9,804,593 B1 * | 10/2017 | Davis | G05B 19/423 |
| 2009/0227834 A1 * | 9/2009 | Nakamoto | A61B 18/1492 600/104 |
| 2011/0015787 A1 * | 1/2011 | Tsusaka | G05B 19/423 700/264 |
| 2011/0190932 A1 * | 8/2011 | Tsusaka | B25J 9/1674 700/256 |

(Continued)

FOREIGN PATENT DOCUMENTS

| | | |
|---|---|---|
| EP | 3 026 517 A1 | 6/2016 |
| JP | H04-344505 A | 12/1992 |

(Continued)

OTHER PUBLICATIONS

Extended European Search Report for Application No. EP 19 17 5376.3 dated Oct. 4, 2019 (8 pages).

*Primary Examiner* — Khoi H Tran
*Assistant Examiner* — Tanner L Cullen
(74) *Attorney, Agent, or Firm* — Harness, Dickey & Pierce, P.L.C.

(57) ABSTRACT

In teaching of a robot, a control device controls a movable unit in a first control mode in which the movable unit continuously moves according to a force detected by a force detector and a second control mode in which the movable unit moves by a predetermined movement amount according to the force detected by the force detector. A controller selects a first control mode or a second control mode according to a temporal change in the force detected by the force detector and a magnitude of the force.

7 Claims, 19 Drawing Sheets

(56) References Cited

U.S. PATENT DOCUMENTS

| | | |
|---|---|---|
| 2011/0313573 A1 | 12/2011 | Schreiber et al. |
| 2016/0154398 A1* | 6/2016 | Yamaguchi .......... G05B 19/423 |
| | | 700/170 |
| 2016/0257003 A1* | 9/2016 | Oyama .................. B25J 9/1676 |
| 2017/0028565 A1* | 2/2017 | Matsudaira .............. B25J 19/06 |
| 2017/0266815 A1 | 9/2017 | Takeuchi |
| 2018/0043525 A1* | 2/2018 | Su ......................... B25J 13/081 |
| 2018/0104817 A1* | 4/2018 | Jerregard ............... B25J 9/1664 |
| 2019/0015972 A1* | 1/2019 | Someya ................. B25J 13/085 |
| 2019/0022857 A1* | 1/2019 | Conus ................... G06N 20/00 |
| 2019/0126476 A1* | 5/2019 | Nakamura ............ B25J 9/1633 |
| 2019/0175292 A1* | 6/2019 | Nakashima ............ B25J 9/1676 |
| 2019/0202066 A1* | 7/2019 | Maret .................... A61B 34/30 |

FOREIGN PATENT DOCUMENTS

| | | |
|---|---|---|
| JP | H11-231925 A | 8/1999 |
| JP | H11-254361 A | 9/1999 |
| JP | 2017-164876 A | 9/2017 |
| WO | WO-2017-152208 A1 | 9/2017 |

* cited by examiner

CONTROL DEVICE AND ROBOT SYSTEM

The present application is based on and claims priority from JP Application Serial Number 2018-097489, filed May 22, 2018, the disclosure of which is hereby incorporated by reference herein in its entirety.

BACKGROUND

1. Technical Field

The present disclosure relates to a control device of a robot and a robot system

2. Related Art

A direct teaching mode in which a teacher directly holds a fingertip of a robot and manipulates a position of the fingertip of the robot has been known as a mode for easily performing a teaching work of a robot. In a direct teaching mode, it is possible to continuously and largely move the robot. However, it is difficult to perform minute positioning simply by moving the robot continuously. Here, a technology of performing minute positioning using a mode in which a robot is moved by a predetermined amount in a predetermined direction according to an external force is disclosed in JP-A-2017-164876.

However, in the above-described technology according to the related art, when a mode is switched, it is necessary to instruct switching of a teaching pendant, which takes time and labor.

SUMMARY

An aspect of the present disclosure provides a control device that controls a robot including a movable unit and a force detecting unit that detects a force applied to the movable unit. The control device includes a controller that controls the movable unit in a first control mode in which the movable unit continuously moves according to the force detected by the force detecting unit and in a second control mode in which the movable unit moves by a predetermined movement amount according to the force detected by the force detecting unit, in the teaching of the robot. The controller selects the first control mode or the second control mode according to one or both of the temporal change in the force detected by the force detecting unit and the magnitude of the force.

DESCRIPTION OF EXEMPLARY EMBODIMENTS

A. First Embodiment

Figure 1:
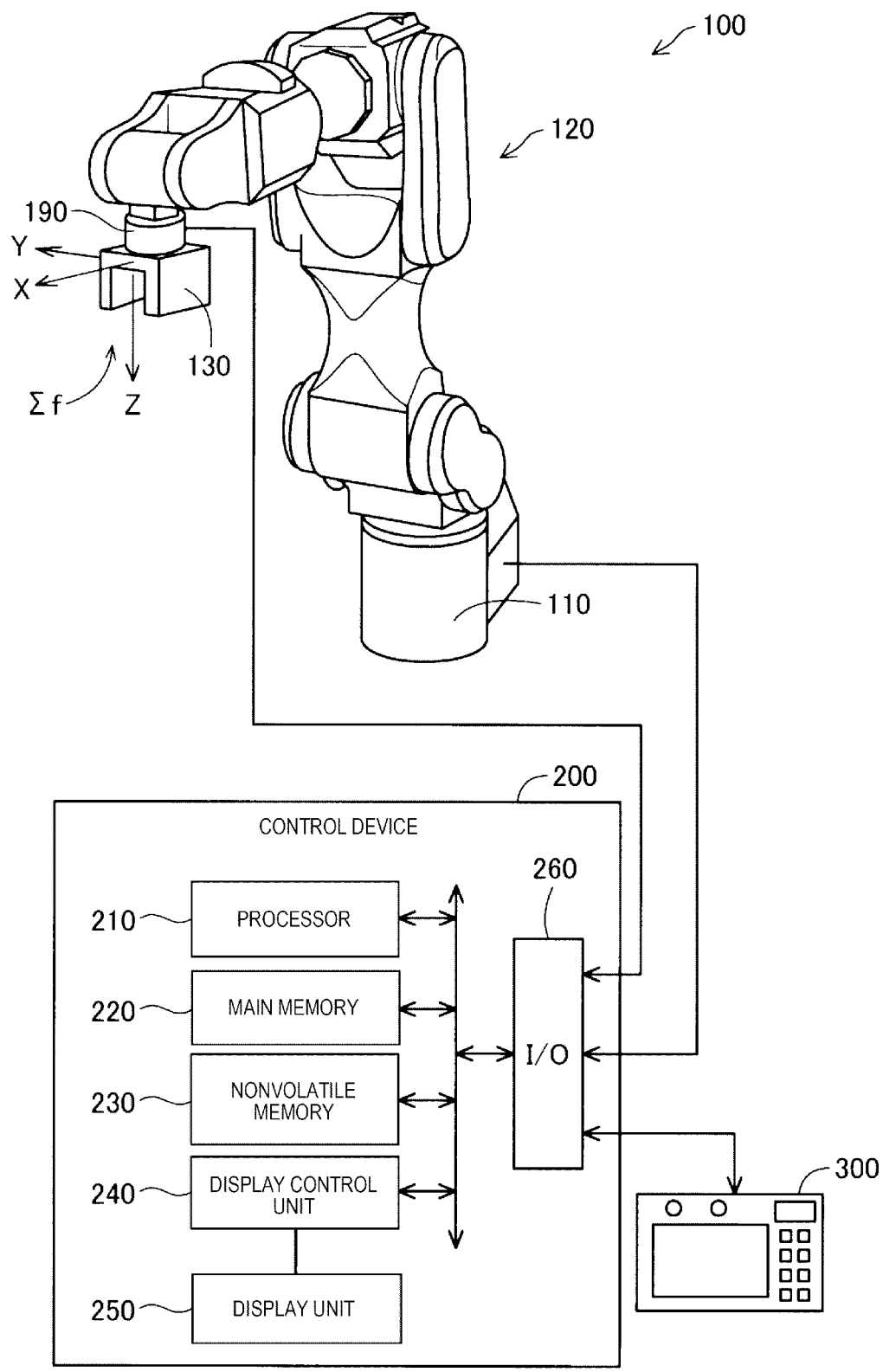
FIG. 1 is a perspective view illustrating an example of a robot system.

FIG. 1 is a perspective view illustrating an example of a robot system. The robot system includes a robot 100, a control device 200, and a teaching device 300. The control device 200 is communicably connected to the robot 100 and the teaching device 300 through a cable or wirelessly.

The robot 100 includes a base 110 and an arm 120. The force detecting unit (force detector) 190 is installed at a tip end of the arm 120, and an end effector 130 is mounted on a tip end side of the force detecting unit 190. Any kind of end effector can be used as the end effector 130. In an example of FIG. 1, for convenience of illustration, the end effector 130 is drawn in a simple shape. The arm 120 includes a plurality of joints. A position near a tip end of the arm 120 can be set as a tool center point (TCP). The TCP is a position used as a reference of the position of the end effector 130, and can be set to any position. In the specification, the arm 120 and the end effector 130 are collectively referred to as a "movable unit".

The control device 200 includes a processor 210, a main memory 220, a nonvolatile memory 230, a display control unit 240, a display unit 250, and an I/O interface 260. These components are connected to each other through a bus. The processor 210 is, for example, a microprocessor or a processor circuit. The control device 200 is connected to the robot 100 and the teaching device 300 through the I/O interface 260. The control device 200 may be accommodated inside the robot 100.

Various configurations other than the configuration illustrated in FIG. 1 may be adopted as a configuration of the control device 200. For example, the processor 210 and the main memory 220 are removed from the control device 200 of FIG. 1, and the processor 210 and the main memory 220 may be provided in another device communicably connected to the control device 200. In this case, the entire device including the other device and the control device 200 functions as a control device of the robot 100. In another embodiment, the control device 200 may have two or more processors 210. In yet another embodiment, the control device 200 may be realized by a plurality of devices communicably connected to each other. In these various embodiments, the control device 200 is configured as a device or a device group including one or more processors 210.

Figure 2:
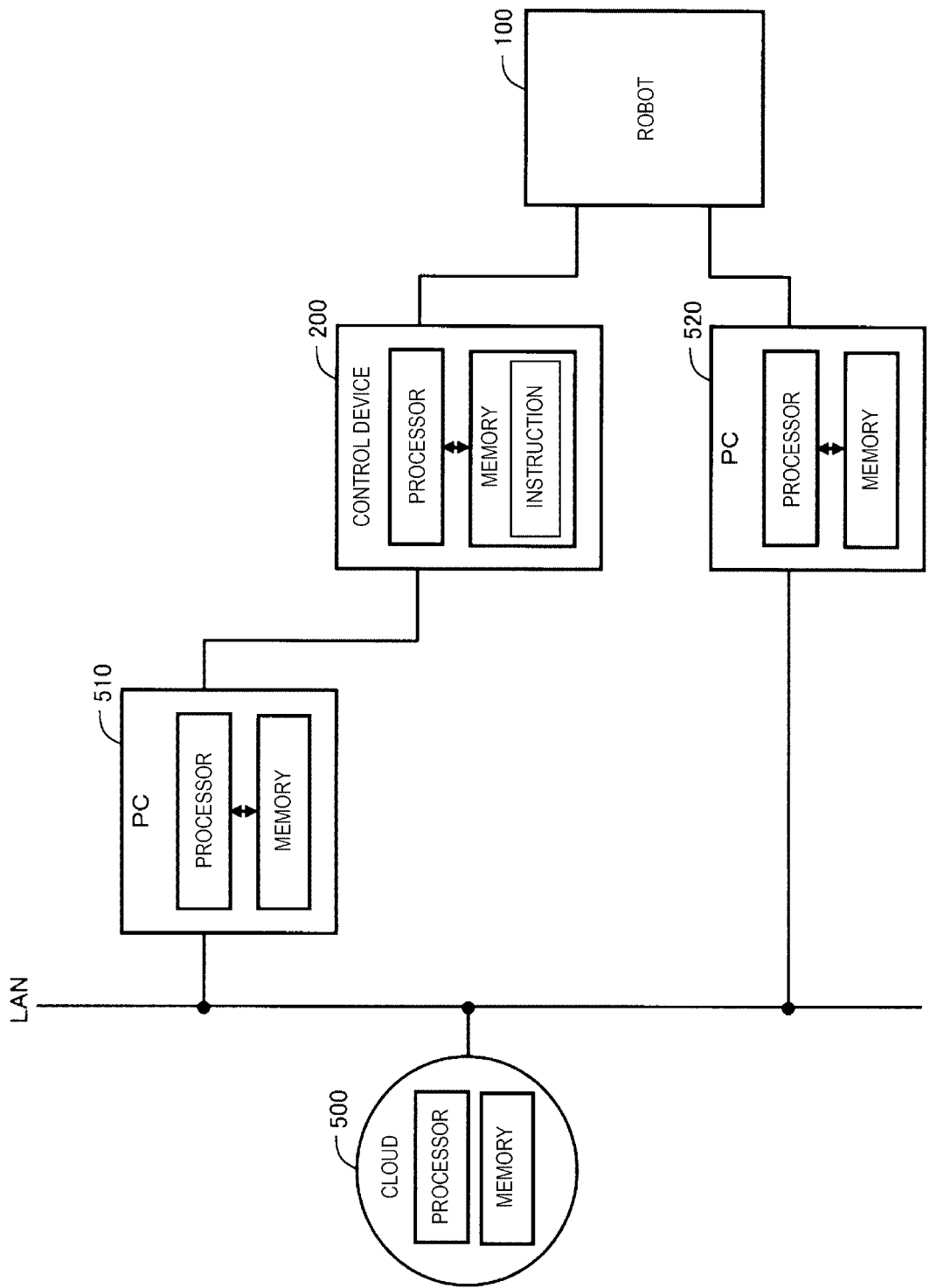
FIG. 2 is a conceptual diagram illustrating an example of a control device having a plurality of processors.

FIG. 2 is a conceptual diagram illustrating an example where a control device of a robot is configured with a plurality of processors. In this example, in addition to the robot 100 and the control device 200 thereof, personal computers 400 and 410 and a cloud service 500 provided via a network environment such as a local area network (LAN) are drawn. Each of the personal computers 400 and 410 includes a processor and a memory. Further, a processor and a memory are also used in the cloud service 500. It is possible to realize the control device of the robot 100 using some or all of the plurality of these processors.

Figure 3:
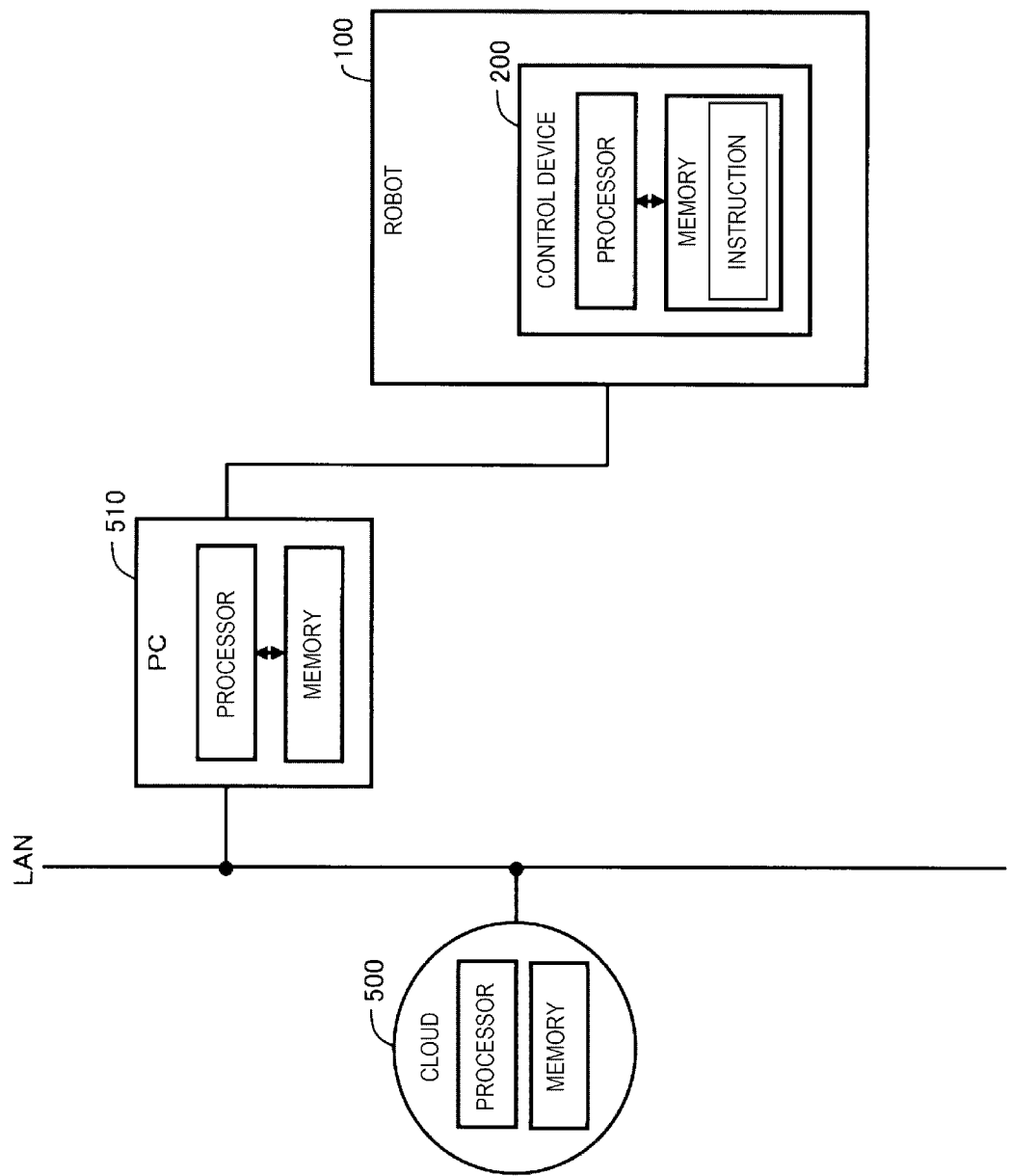
FIG. 3 is a conceptual diagram illustrating another example of a control device having a plurality of processors.

FIG. 3 is a conceptual diagram illustrating another example where a control device of a robot is configured with a plurality of processors. In this example, the control device 200 of the robot 100 is different from those of FIG. 2 in that the control device 200 is stored in the robot 100. Even in this example, it is possible to realize the control device of the robot 100 using some or all of the plurality of these processors.

The teaching device 300 is used when creating a control program (teaching data) for work of the robot 100. The teaching device 300 is also called a "teaching pendant". Instead of the teaching pendant, a personal computer on which a teaching processing application program is installed may be used. In the case of teaching processing, the control device 200 and the teaching device 300 function as "control devices". The teaching processing may be used using only the control device 200 without using the teaching device 300.

The force detecting unit 190 is a six-axis force/torque sensor that measures an external force applied to the end effector 130. The force detecting unit 190 has three detection axes X, Y, and Z orthogonal to each other in a sensor coordinate system Σf which is a unique coordinate system, and detects the magnitude of the force parallel to each detection axis and the magnitude of the torque around each detection axis (moment of force). The force parallel to each detection axis is called a "translational force". Further, a torque around each detection axis is called a "rotational force". In the present specification, the term "force" is used to include both the translational force and the rotational force.

The force detecting unit 190 may use a sensor that detects a force in a lesser direction with no need to be a sensor that detects forces of six axes. Further, instead of providing the force detecting unit 190 at the tip end of the arm 120, a force sensor as a force detecting unit may be provided on one or more joints of the arm 120. The "force detecting unit" may function to detect a force. That is, the "force detecting unit" may be a device that directly detects a force like a force/torque sensor or may be a device that indirectly obtains a force like an inertial measurement unit (IMU) or a device that detects a force from a current value of an actuator of the arm 120. Further, the "force detecting unit" may be externally attached to the robot 100 or may be embedded in the robot 100.

Figure 4:
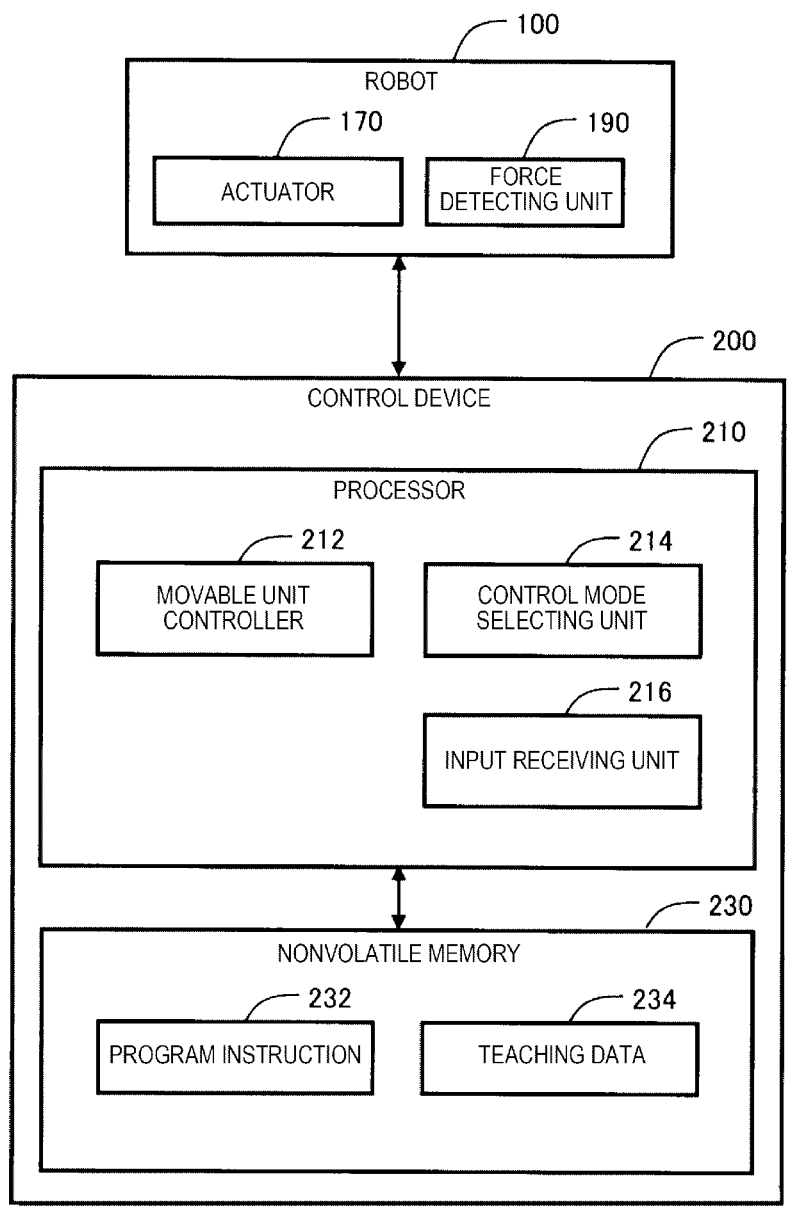
FIG. 4 is a functional block diagram illustrating a robot and the control device.

FIG. 4 is a block diagram illustrating functions of the robot 100 and the control device 200. The robot 100 has a plurality of actuators 170 for driving a plurality of joints in addition to the above-described force detecting unit 190. The processor 210 of the control device 200 realizes functions of a movable unit controller 212, a control mode selecting unit 214, and an input receiving unit (receiver) 216 by executing a program instruction 232 previously stored in the nonvolatile memory 230. The movable unit controller 212 moves the arm 120 by controlling the actuator 170. The control mode selecting unit 214 selects a first control mode or a second control mode, which will be described below, according to a temporal change in a force detected by the force detecting unit 190. In the first control mode or the second control mode, control of the arm 120 is executed by the movable unit controller 212. The processor 210, which executes functions of the movable unit controller 212 and the control mode selecting unit 214, corresponds to a "controller". Teaching data 234 created by teaching processing is stored in the nonvolatile memory 230. Some or all of the functions of the movable unit controller 212, the control mode selecting unit 214, and the input receiving unit 216 may be realized by a hardware circuit.

In the teaching processing, a plurality of control modes including the first control mode and the second control mode, which will be described below, can be used.

First Control Mode

The first control mode is a mode in which the arm 120 continuously moves according to the force detected by the force detecting unit 190. In the first control mode, which is a mode called so-called direct teaching, when a user applies a force while holding the end effector 130, the arm 120 moves smoothly according to the force. At this time, the control device 200 executes compliance control which is a kind of force control, to move the arm 120. The movement by the first control mode is also called a "continuous movement". The compliance control used in the direct teaching is a control of moving the arm based on a predetermined force control parameter (the mass M of the equation of motion, the viscosity coefficient D, and the elastic coefficient K).

Second Control Mode

The second control mode is a mode in which the arm 120 moves by a predetermined movement amount according to the force detected by the force detecting unit 190. In the second control mode, when a force equal to or more than a predetermined threshold is detected as the user lightly taps the end effector 130, lightly pulls the end effector 130, or lightly twists the end effector 130, the arm 120 moves by a predetermined movement amount. The movement amount is set to a small translation amount (a translation movement amount) of, for example, 0.1 mm to 1 mm, with respect to the translational force and is set to a small rotation angle (a rotation movement amount) of, for example, 0.1 degrees to 3 degrees with respect to a rotational force. In this way, the positions of the end effector 130 and the TCP can be finely adjusted. The movement by the second control mode is called a "fixed amount movement".

In the first embodiment, either the first control mode or the second control mode is selected according to the temporal change in the force detected by the force detecting unit 190. In the teaching processing, the user of the robot 100 is called a "teacher".

Figure 5:
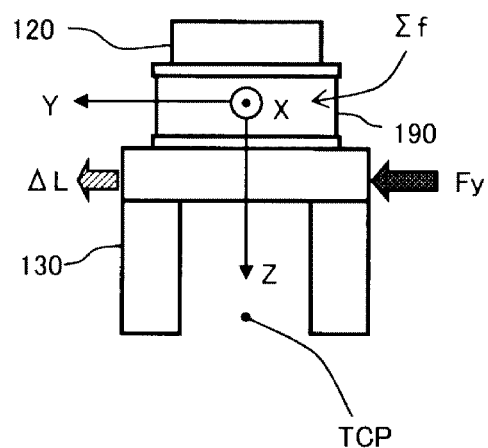
FIG. 5 is a diagram for illustrating a relationship between a translational force and a movement amount in a second control mode.

FIG. 5 is a diagram for illustrating a relationship between the translational force and the movement amount in the second control mode. In this example, the user applies a small translational force Fy to the end effector 130 in a Y-axis direction, and according to the translational force Fy, the movable unit including the arm 120 and the end effector 130 moves by a predetermined small movement amount ΔL in the Y-axis direction.

Figure 6:
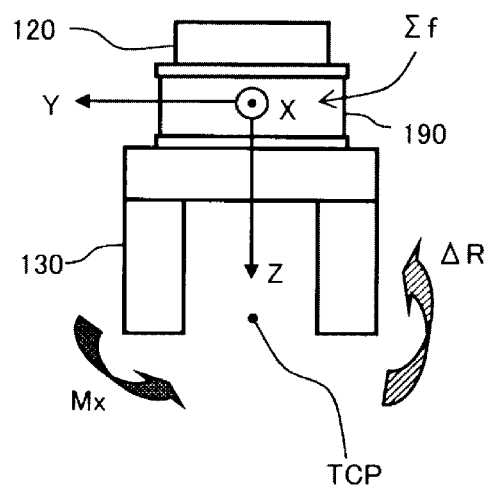
FIG. 6 is a diagram for illustrating a relationship between a rotational force and a rotation amount in the second control mode.

FIG. 6 is a diagram for illustrating a relationship between the rotational force and the movement amount in the second control mode. In this example, the user applies a small rotational force Mx to the end effector 130 around the X-axis, and according to the rotational force Mx, the movable unit including the arm 120 and the end effector 130 rotates by a predetermined small rotation amount ΔR along a rotational direction around the X-axis. In a broad sense, the rotation amount ΔR is included in the "movement amount". In the second control mode, the rotation may be performed, for example, with the TCP as a center.

In the second control mode, when a plurality of translational forces or a plurality of rotational forces, which are equal to or more than a threshold, are detected at the same time, the following options exist as the moving method. In a setting screen of the teaching processing, the control device 200 may be configured such that the user can select which of two options A1 and A2 is adopted. The same method is applied to selection of options B1 and B2 and selection of options C1 and C2.

Option of moving method when translational forces are simultaneously detected in a plurality of directions
A1: Move by the predetermined movement amount ΔL in the plurality of directions in which the translational force is detected.
A2: Move by the predetermined movement amount ΔL only in a direction in which a peak of the force is greatest among the plurality of directions in which the translational force is detected.
Option of moving method when rotational forces about a plurality of axes are simultaneously detected
B1: Rotate by a predetermined rotation amount ΔR around a plurality of axes on which the rotational force is detected.
B2: Rotate by a predetermined rotation amount ΔR only around an axis having the largest peak of a force among the plurality of axes on which the rotational force is detected.
Option of moving method when translational force and rotational force are simultaneously detected
C1: Rotate by a predetermined rotation amount ΔR about an axis on which the rotational force is detected without moving according to the translational force.
C2: Move by a predetermined movement amount ΔL in a direction in which the translational force is detected, and rotate by a predetermined rotation amount ΔR around the axis on which the rotational force is detected.

As illustrated in FIG. 6, when the end effector 130 is twisted, the translational force is often detected as well as the rotational force. Thus, when the rotational force and the translational force are simultaneously detected, the user may not intend movement in the translational direction. In the option C1, the movement according to the translational force is not performed in consideration of such a case.

Figure 7:
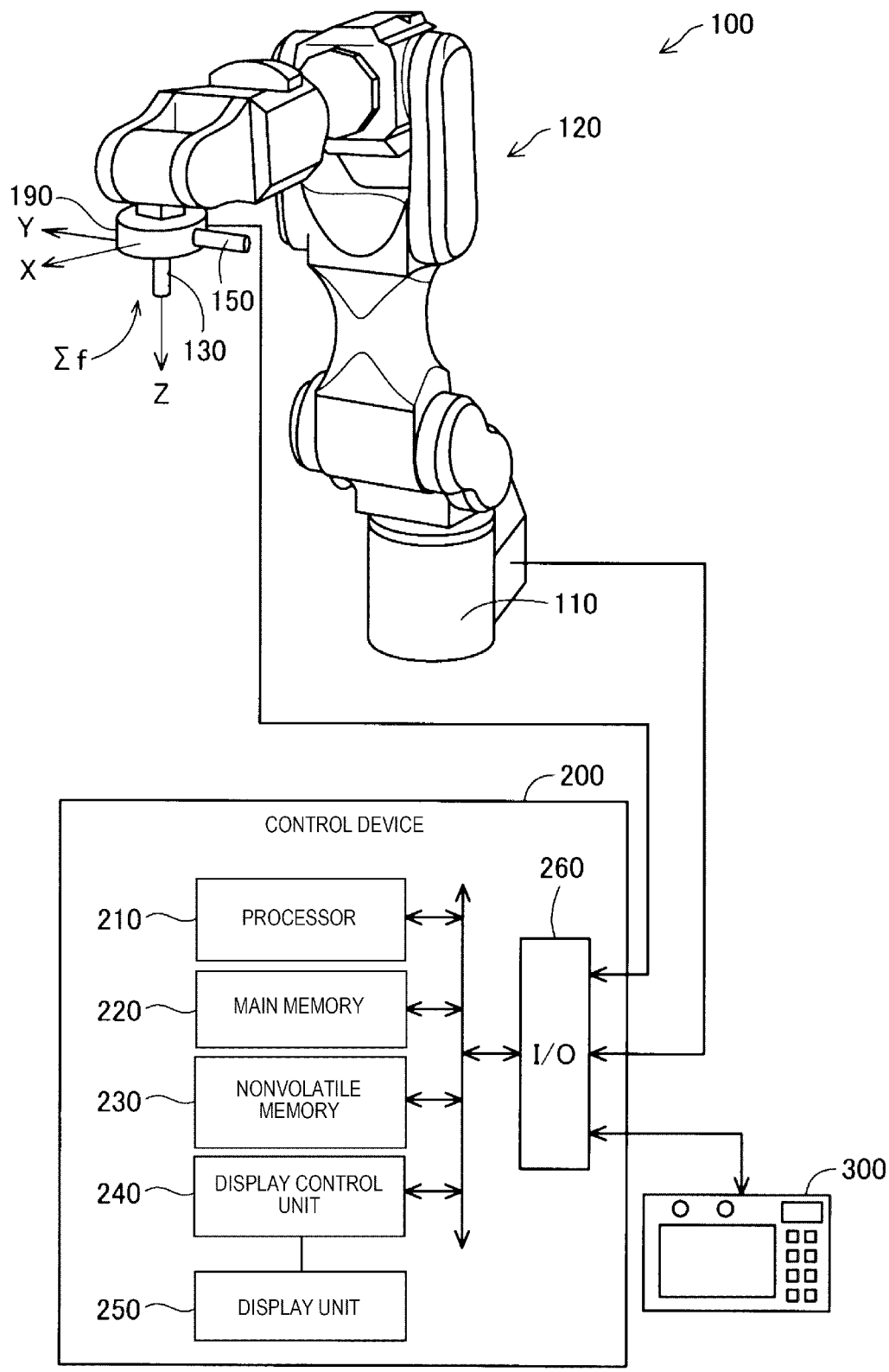
FIG. 7 is a perspective view illustrating another example of the robot system.

FIG. 7 illustrates another example of a robot system. In this example, the end effector 130 has a smaller and thinner shape than the shape of FIG. 1. When the size of such an end effector 130 is small, a force for selecting the first control mode and the second control mode is not easily applied to the end effector 130. Here, in this example, a handle 150 is installed in the force detecting unit 190, and a force is applied to the handle 150, so that the teaching processing can be executed while selecting the first control mode and the second control mode. In order to accurately detect the force applied to the handle 150, the handle 150 may be provided on a tip end side of the force detecting unit 190.

Figure 8:
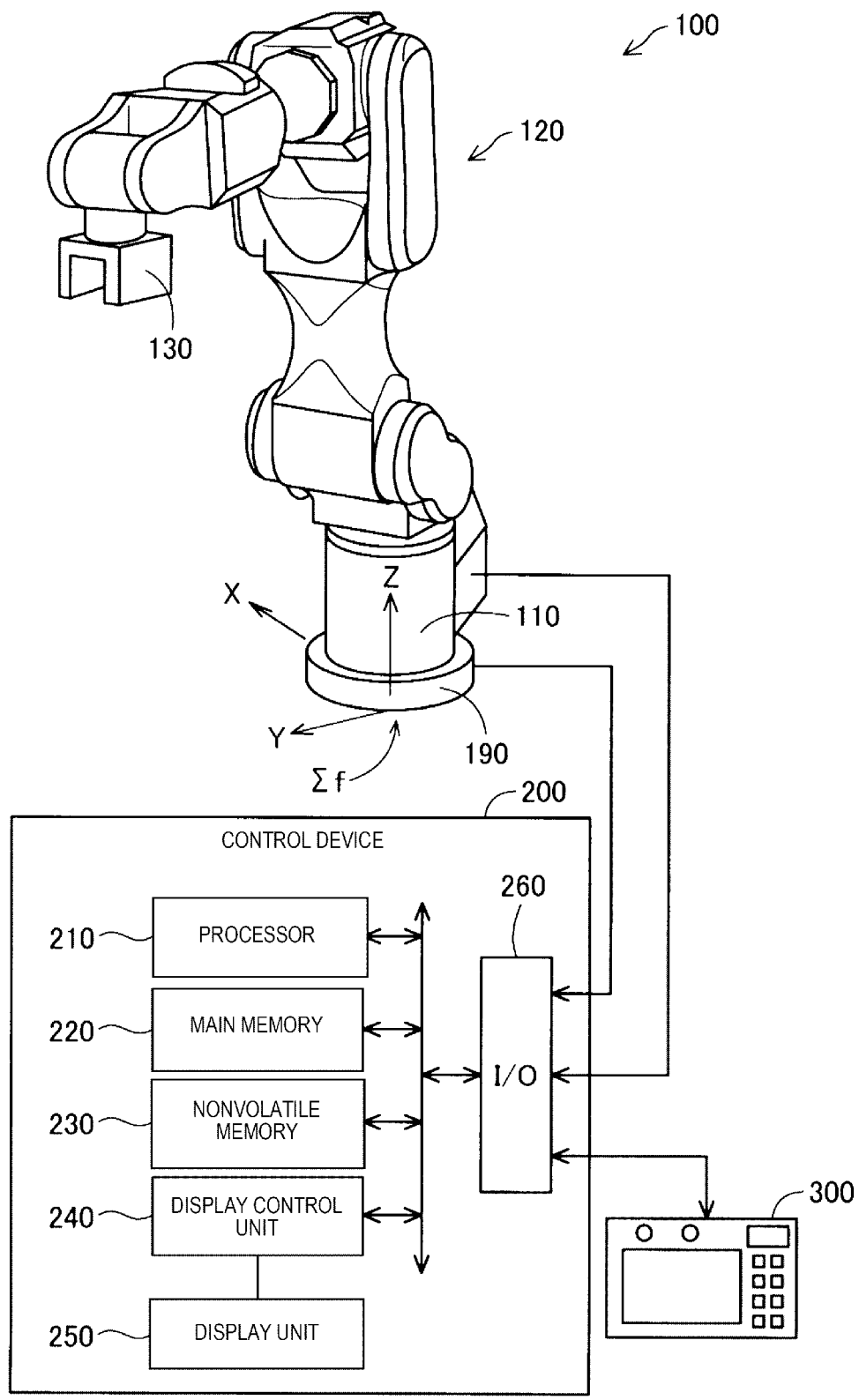
FIG. 8 is a perspective view illustrating another example of the robot system.

FIG. 8 illustrates another example of the robot system. In this example, the force detecting unit 190 is provided below a base 110 of the robot 100. In this configuration, even when the force is applied to a middle portion of the arm 120, the arm 120 can be controlled in the first control mode or the second control mode. As can be understood from this example, among the movable unit of the robot 100, according to the force applied to any portion further on the tip end side than the force detecting unit 190, control can be executed in the first control mode or the second control mode.

Figure 9:
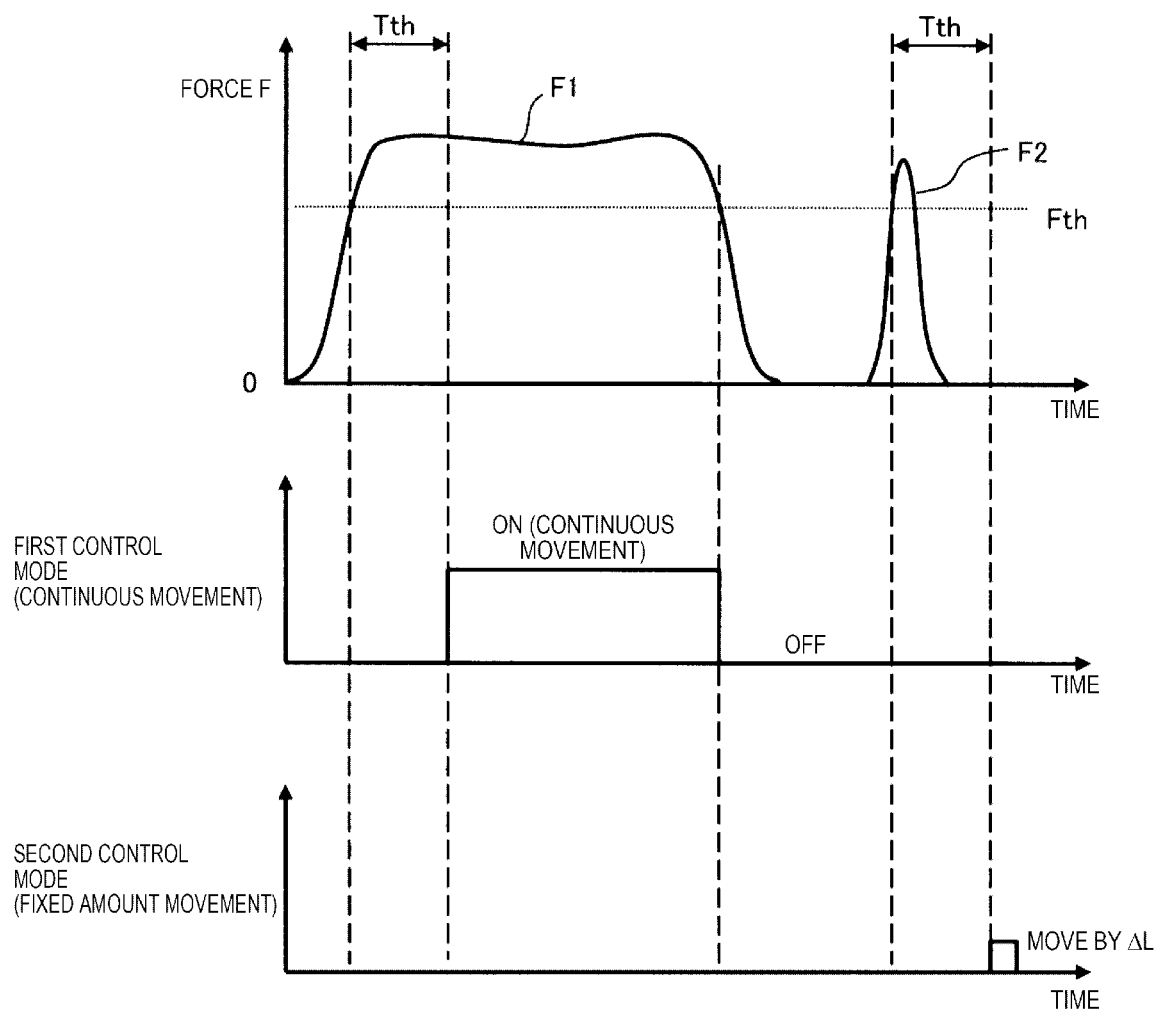
FIG. 9 is a graph illustrating an example of a change in a force according to a first embodiment.

FIG. 9 is a graph depicting an example of a change in a force F detected by the force detecting unit 190. In this example, two translational forces F1 and F2 having peaks equal to or more than a force threshold Fth are detected. A continuous time during which the first translational force F1 is equal to or more than the force threshold Fth is equal to or more than a continuous time threshold Tth. When the translational force F1 is detected, the first control mode is selected, and a continuous movement of the end effector 130 is performed along a direction of the translational force F1. That is, the end effector 130 moves smoothly in a direction in which the user applies force while being grasped by the user. The second translational force F2 illustrates a pulse-like change in which a continuous time during which the second translational force F2 is equal to or more than the force threshold Fth is less than a continuous time threshold Tth which is more than zero. Such a pulse-like translational force F2 is generated, for example, by the user lightly tapping the end effector 130. When the pulse-like translational force F2 is detected, the second control mode is selected, and a movement of the end effector 130 is performed along a direction of the translational force F2 by a predetermined movement amount ΔL. As for the rotational force, although the selection and the movement of the control mode are executed, description of the rotational force will be omitted. This is also applied to other examples described below.

As can be understood from FIG. 9, in the first embodiment, the control mode selecting unit 214 selects the first control mode or the second control mode according to a temporal change in a force F detected by the force detecting unit 190. In more detail, the first control mode or the second control mode is selected according to a length of a period during which the magnitude of the force F is equal to or more than the force threshold Fth. Thus, according to a temporal change in the force applied to the movable unit of the robot 100 by the user, the control mode can be easily switched. In FIG. 9, the control mode in a state in which the force is not detected may be set to either the first control mode or the second control mode or may be set to another control mode. Even in any cases, since the force is not detected, there is the same point in that the continuous movement in the first control mode and the fixed amount movement in the second control mode are not executed.

Figure 10:
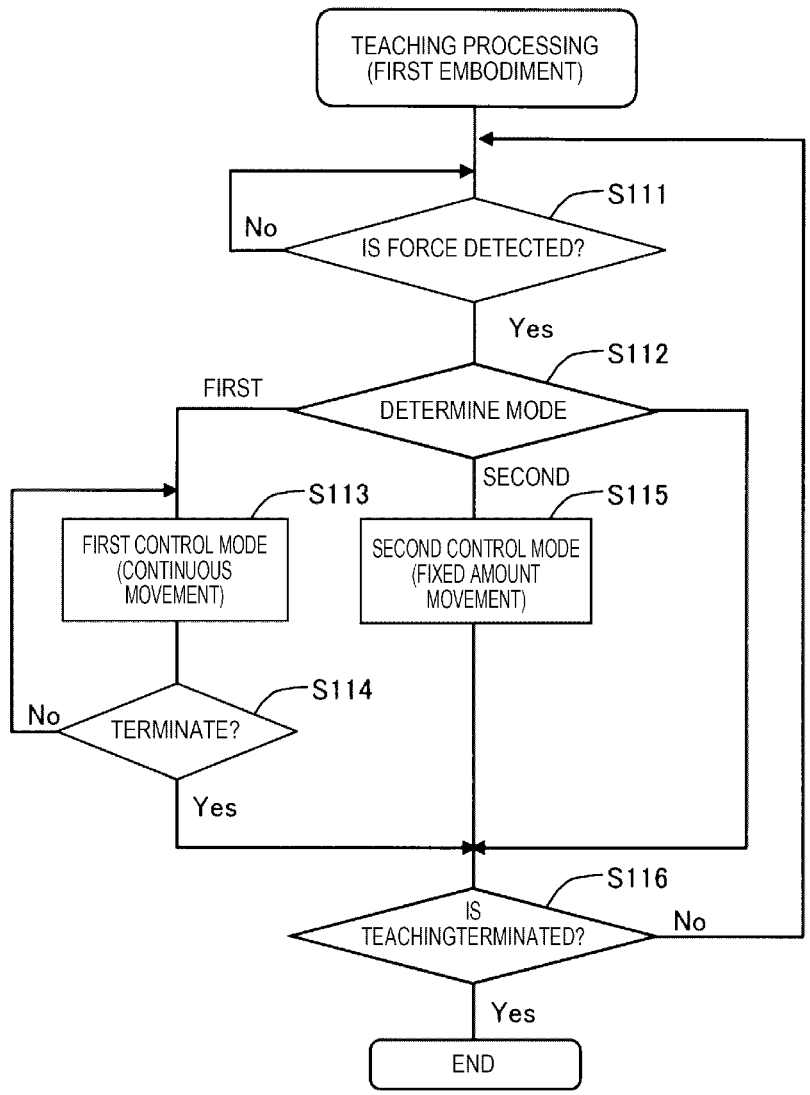
FIG. 10 is a flowchart illustrating teaching processing according to the first embodiment.

FIG. 10 is a flowchart illustrating teaching processing according to the first embodiment. In a state in which the robot 100 is set to the teaching mode by the teaching device 300, the teaching processing is executed by the movable unit controller 212 and the control mode selecting unit 214 of the control device 200.

In step S111, the process stands by until the force is detected by the force detecting unit 190, and proceeds to step S112 when the force is detected. In step S112, the control mode selecting unit 214 determines and selects the control mode. In detail, as described with reference to FIG. 9, the first control mode or the second control mode is selected according to the temporal change in the force detected by the force detecting unit 190. When the first control mode is selected in step S112, the process proceeds to step S113, and the movable unit controller 212 executes the continuous movement by the first control mode. After the first control mode continues until it is determined in step S114 that the continuous movement by the first control mode is completed, the process proceeds to step S116. For example, as illustrated in FIG. 9, it is determined that the first control mode is terminated when the force becomes less than the force threshold Fth. However, a value different from the force threshold Fth for selecting the control modes may be used as the force threshold for termination determination. When the second control mode is selected in step S112, the process proceeds to step S115, and after the movable unit controller 212 executes the fixed amount movement by the second control mode, the process proceeds to step S116. When the force detected in step S111 does not exceed the force threshold Fth, in step S112, neither the first control mode nor the second control mode is selected, and the process proceeds to step S116. In step S116, whether or not the teaching processing is terminated is determined, and when the teaching processing is not completed, the process returns to step S111. An instruction to terminate the teaching processing can be performed by, for example, the user using the teaching device 300.

As described above, in the first embodiment, either the first control mode or the second control mode is selected according to the temporal change in the force detected by the force detecting unit 190. In more detail, the first control mode or the second control mode is selected according to a length of a period during which the magnitude of the force F is equal to or more than the force threshold Fth. Thus, according to a temporal change in the force applied to the movable unit of the robot 100 by the user, the control mode can be easily switched.

In the above-described first embodiment, when the continuous time during which the magnitude of the force F is equal to or more than the force threshold Fth is more than zero and less than the continuous time threshold Tth, the second control mode is selected. When the continuous time is equal to or more than the continuous time threshold Tth, the first control mode is selected. Either the first control mode or the second control mode may be selected using another method. For example, it is possible to select either the first control mode or the second control mode by using one of the following feature amounts related to the temporal change in the force F.

Example of feature amount related to temporal change in force
(a) the length of the time during which the force is equal to or more than the force threshold
(b) a frequency of the temporal change in the force, particularly, a peak frequency of a frequency spectrum of the temporal change in the force
(c) the differential value of the force, particularly, the peak magnitude of a force differential value
(d) a degree of pattern matching between the temporal change in the force and a predetermined force change pattern In the above-described first embodiment, it can be considered that the feature amount (a) is used. In this way, it is possible to select either the first control mode or the second control mode by using a predetermined feature amount related to the temporal change in the force F. In this case, a threshold suitable for the feature amount is set in advance.

B. Second Embodiment

Figure 11:
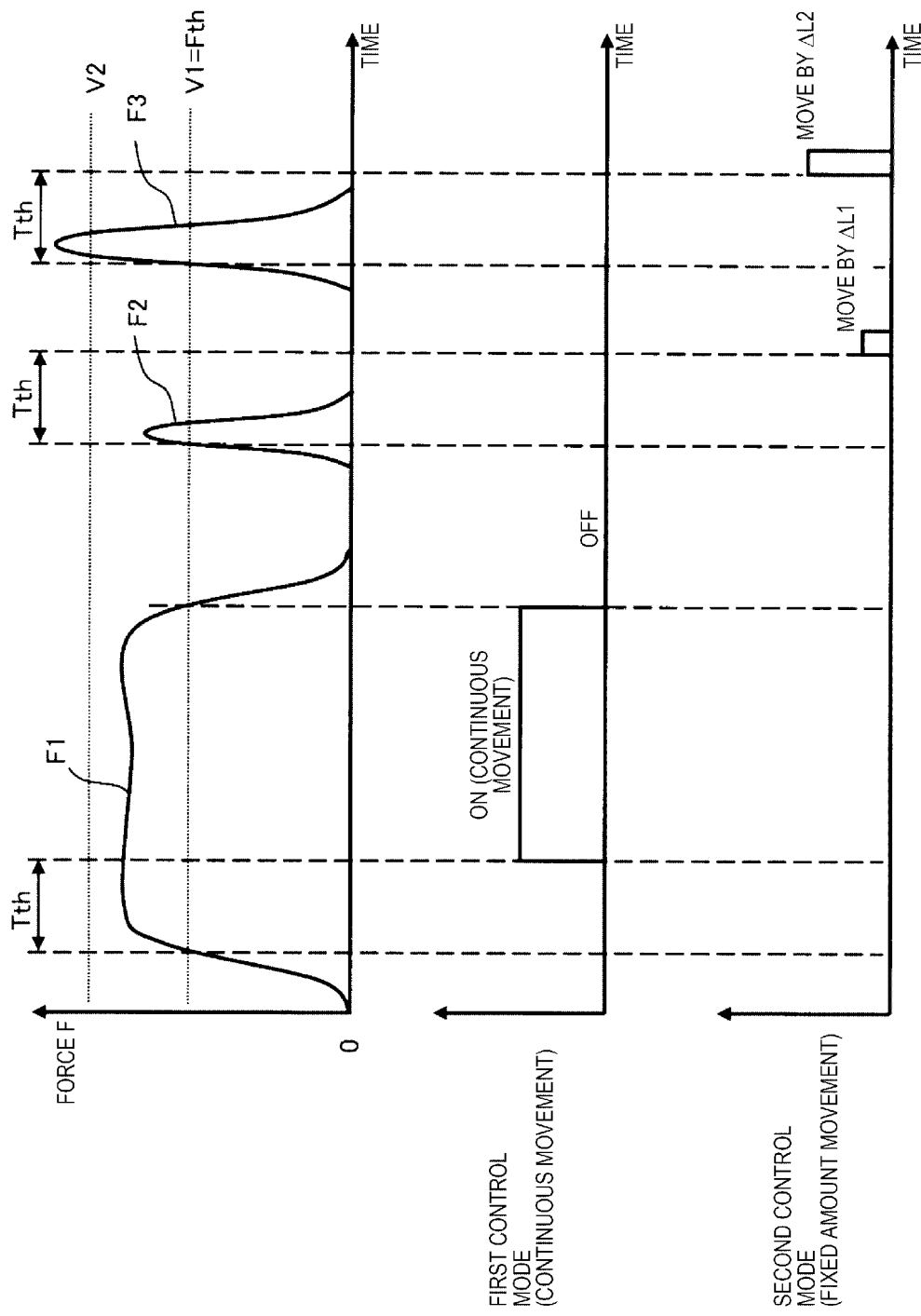
FIG. 11 is a graph illustrating an example of a change in a force according to a second embodiment.

FIG. 11 is a graph depicting an example of a change in a force detected by the force detecting unit 190 according to the second embodiment. The second embodiment differs from the first embodiment only in the control mode determining method, and is equal to the first embodiment in the device configuration and the processing procedure.

The first translational force F1 and the second translational force F2 in FIG. 11 are the same as those illustrated in FIG. 9 according to the first embodiment. In FIG. 11, a first value V1 equal to the force threshold Fth illustrated in FIG. 9 and a second value V2 larger than the first value V1 are used as a force threshold. Similarly to the above-described first embodiment, the peaks of the first translational force F1 and the second translational force F2 are both equal to or more than the first value V1 (=Fth), and either the first control mode or the second control mode is selected and executed depending on a difference in the continuous time. Similarly to the second translational force F2, even in the third translational force F3, since the continuous time during which the third translational force F3 is equal to or more than the first value V1 (=Fth) is more than zero and less than the continuous time threshold Tth, the second control mode is selected and executed. However, the peak of the second translational force F2 is less than the second value V2 and equal to or more than the first value V1, and the peak of the third translational force F3 is equal to or more than the second value V2. In this case, in the second control mode executed according to the second translational force F2, movement of the end effector 130 by a predetermined movement amount ΔL1 is executed. Further, in the second control mode executed according to the third translational force F3, movement of the end effector 130 by a predetermined movement amount ΔL2 along a direction of the translational force F3 is executed. The movement amount ΔL2 according to the third translational force F3 is set to a value more than the movement amount ΔL1 according to the second translational force F2. For example, the first movement amount ΔL1 is set to 0.1 mm, and the second movement amount ΔL2 is set to 1 mm.

In FIG. 11, a plurality of thresholds V1 and V2 are set for the second control mode. If movement by the different movement amounts ΔL1 and ΔL2 depending on which one of the thresholds the peak of the force F is greater than or equal to is executed, the user can easily use rougher fine adjustment and finer fine adjustment.

In an example of FIG. 11, when the continuous time during which the force F is equal to or more than the first value V1 (=Fth) is equal to or more than the continuous time threshold Tth, the first control mode is selected. Instead, when the continuous time during which the force F is equal to or more than the second value V2 is equal to or more than the continuous time threshold Tth, the first control mode may be selected.

As described above, in the second embodiment, since the first control mode or the second control mode is selected depending on both the temporal change in the force F and the magnitude of the force F, the user can easily switch the control mode.

C. Third Embodiment

Figure 12:
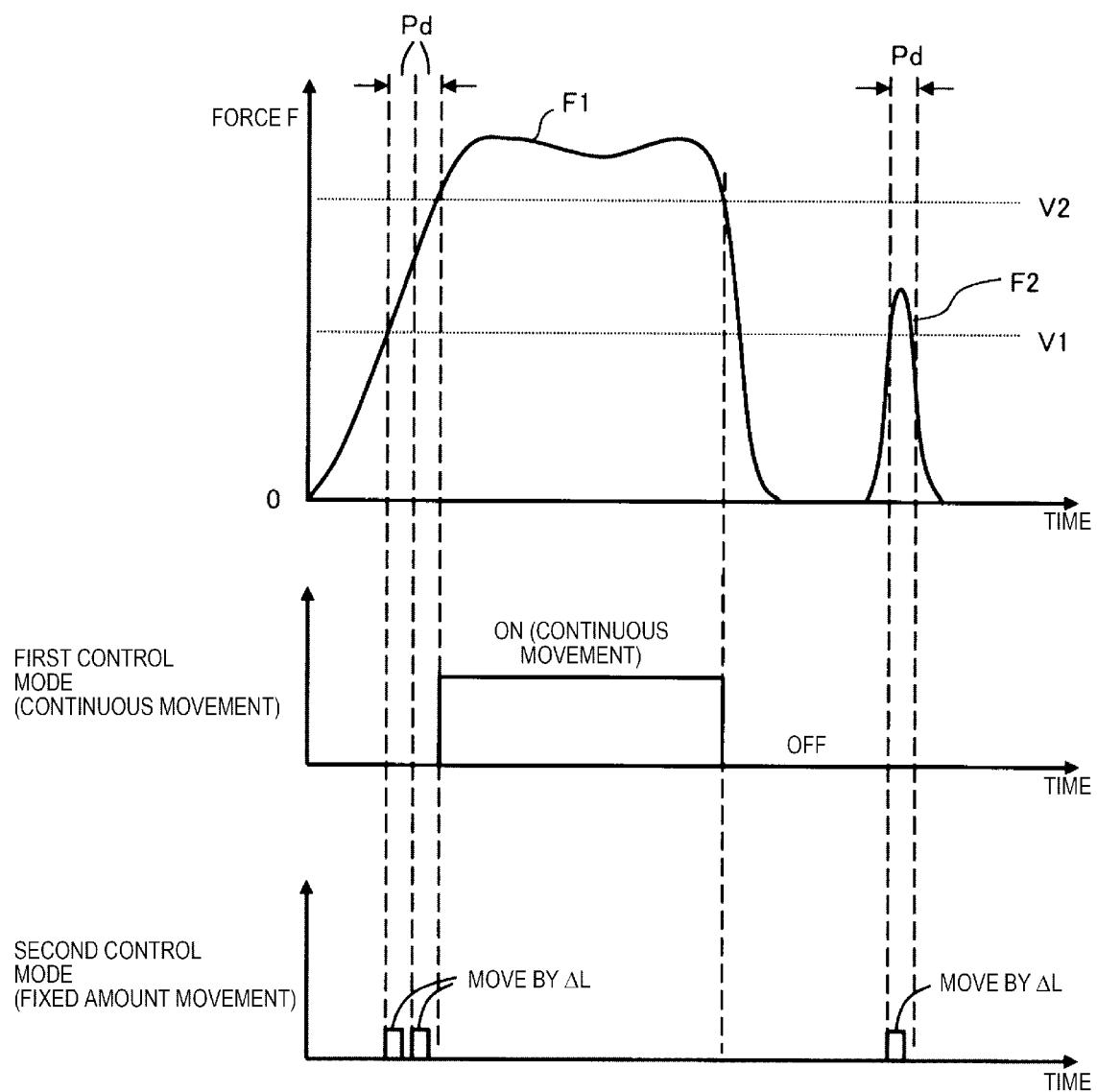
FIG. 12 is a graph illustrating an example of a change in a force according to a third embodiment.

FIG. 12 is a graph depicting an example of a change in a force detected by the force detecting unit 190 according to the third embodiment. The third embodiment differs from the first embodiment only in the control mode determining method, and is equal to the first embodiment in the device configuration and the processing procedure.

In an example of FIG. 12, the first value V1 and the second value V2 are used as the force threshold. Values different from the values illustrated in FIG. 11 can be used as values V1 and V2. In the third embodiment, the magnitude of the force F is determined in each constant period Pd, and the continuous time threshold Tth used in the first embodiment is not used. When the force F becomes equal to or more than the first value V1 at a start point of each period Pd, the second control mode is selected and the fixed amount movement by a predetermined movement amount ΔL is executed. Further, when the force F becomes equal to or more than the second value V2 at a start point of each period Pd, the first control mode is selected and the continuous movement is executed. For example, when the first translational force F1 is applied, two fixed amount movements are executed in the second control mode from a time point when the first translational force F1 becomes equal to or more than the first value V1. Thereafter, the continuous movement is executed in the first control mode from a time point when the first translational force F1 becomes equal to or more than the second value V2. Meanwhile, when the second translational force F2 is applied, one fixed amount movement is executed in the second control mode from a time point when the second translational force F2 is equal to or more than the first value V1.

As described above, in the third embodiment, either the first control mode or the second control mode is selected according to the magnitude of the force F. In this way, according to the magnitude of the force applied to the movable unit of the robot 100 by the user, the control mode can be easily switched.

D. Fourth Embodiment

Figure 13:
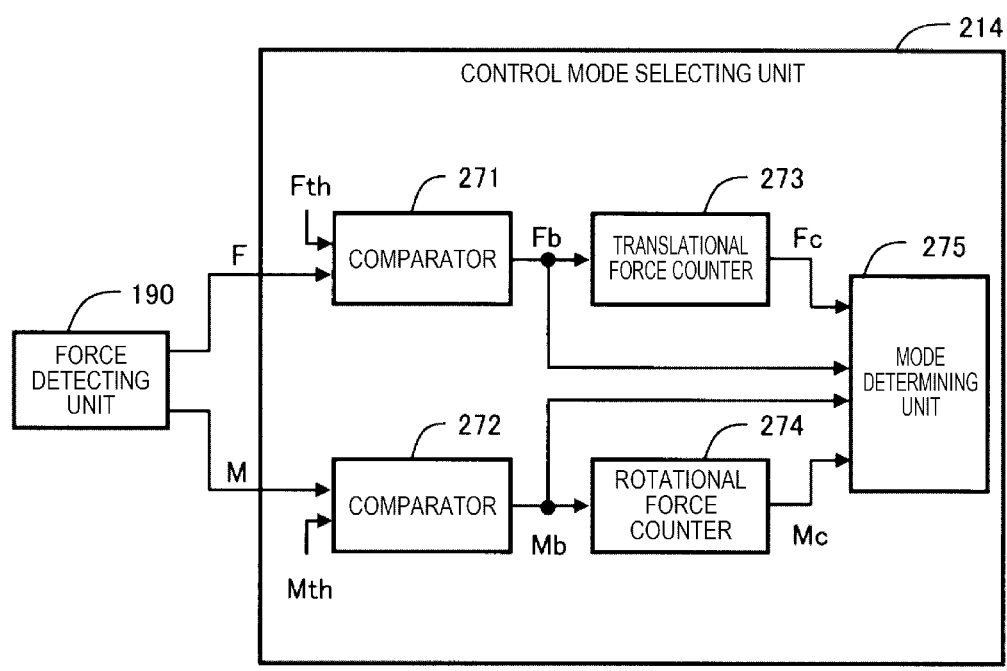
FIG. 13 is a functional block diagram illustrating a control mode selecting unit according to a fourth embodiment.

FIG. 13 is a functional block diagram illustrating a control mode selecting unit 214 according to a fourth embodiment. In the fourth embodiment, the overall configuration of the robot system is the same as that of the first embodiment, and the configuration of the control mode selecting unit 214 and the processing procedure of the teaching processing are different from those of the first embodiment.

The control mode selecting unit 214 has two comparators 271 and 272, a translational force counter 273, a rotational force counter 274, and a mode determining unit 275. The translational force F detected by the force detecting unit 190 is input to a first comparator 271 and is compared with a force threshold Fth. The force threshold Fth is the same as the force threshold Fth illustrated in FIG. 9. Two determination values Fb indicating a result of the comparison by the first comparator 271 are input to the translational force counter 273, and the number of times that a value of the determination value Fb is 1 is counted. Meanwhile, the rotational force M detected by the force detecting unit 190 is input to a second comparator 272 and is compared with a force threshold Mth. Two determination values Mb indicating a result of the comparison by the second comparator 272 are input to the rotational force counter 274, and the number of times that a value of the determination value Mb is 1 is counted. A count value Fc of the translational force counter 273 and a count value Mc of the rotational force counter 274 are input to the mode determining unit 275. The mode determining unit 275 determines whether to select either the first control mode or the second control mode from the determination values Fb and Mb and the count values Fc and Mc.

Figure 14:
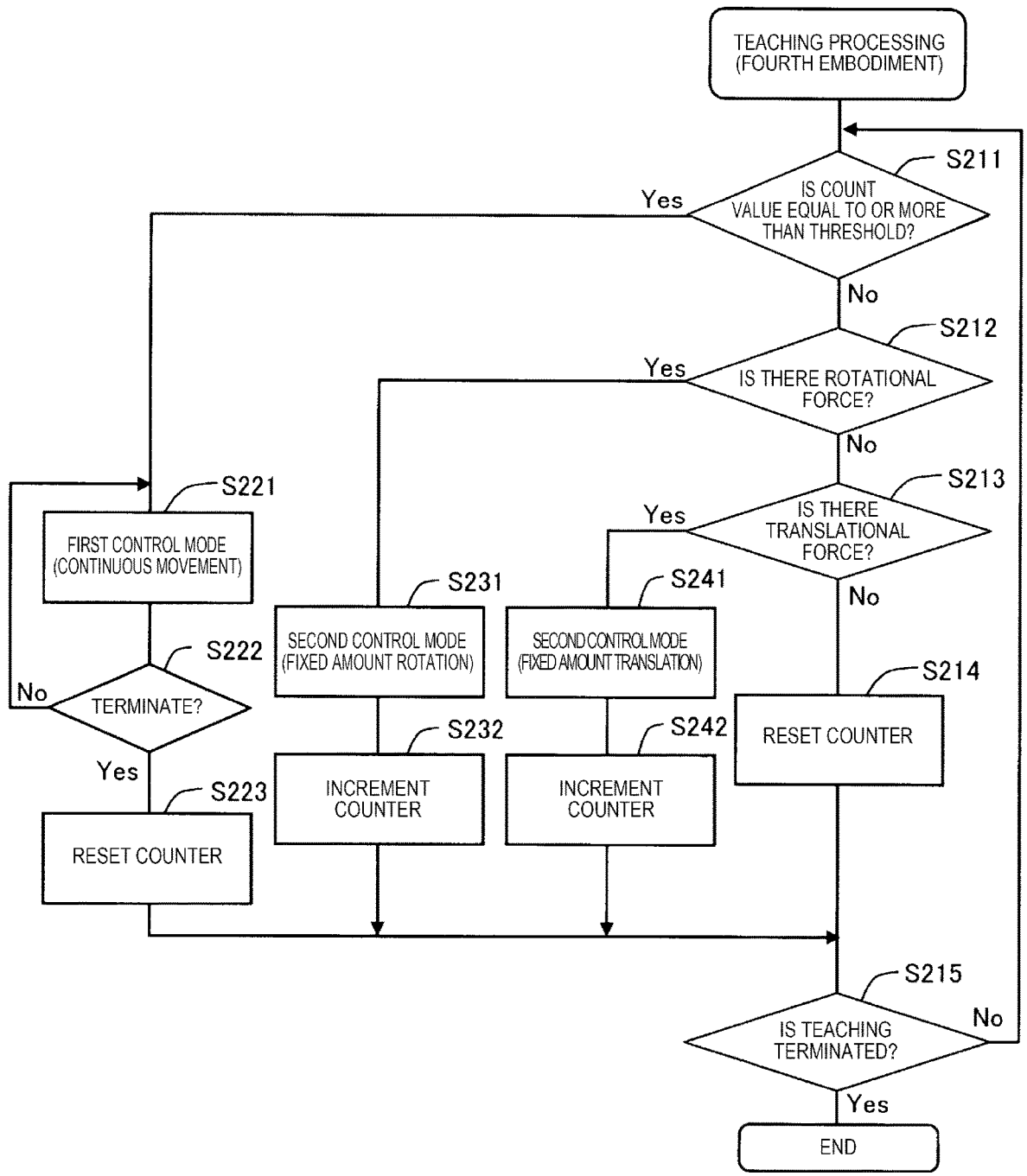
FIG. 14 is a flowchart illustrating teaching processing according to the fourth embodiment.
Figure 15:
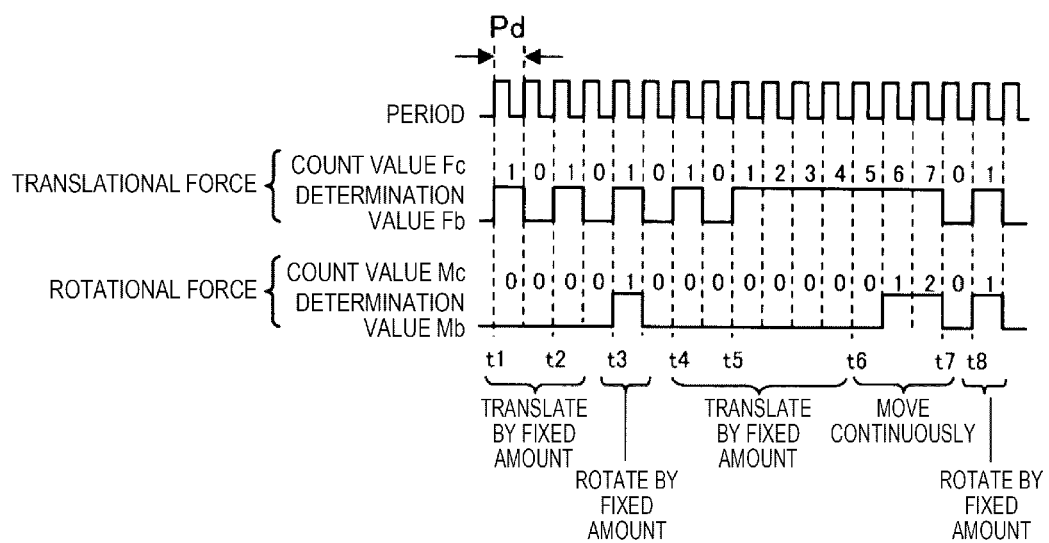
FIG. 15 is a timing chart illustrating a selection example of a first control mode and a second control mode according to the fourth embodiment.

FIG. 14 is a flowchart illustrating teaching processing according to the fourth embodiment, and FIG. 15 is a timing chart thereof. As illustrated in FIG. 15, the comparison by the comparators 271 and 272 is executed for each predetermined period Pd, and the determination values Fb and Mb indicating the comparison result are also counted for each period Pd to generate count values Fc and Mc.

In step S211 of FIG. 14, the mode determining unit 275 determines whether or not at least one of the count values Fc and Mc is equal to or greater than a predetermined threshold. This threshold is a threshold for determining whether or not a current mode is the first control mode. In an example of FIG. 15, the threshold is set to five. When at least one of the count values Fc and Mc is equal to or more than the threshold, the process proceeds to step S221, and the continuous movement by the first control mode is executed. The first control mode continues until the determination values Fb and Mb of the comparators 271 and 272 become zero in step S222. In an example of FIG. 15, from a time t6 to a time t7, the continuous movement by the first control mode is executed. When the first control mode is terminated, the counters 273 and 274 are reset to zero in step S223, and the process proceeds to step S215.

In step S211, when both the count values Fc and Mc are less than the threshold, the process proceeds to step S212, and whether or not the rotational force is detected is determined. This determination is determination on whether or not the determination value Mb of the comparator 272 of the rotational force is 1. When the rotational force is detected, the process proceeds to step S231, the second control mode is selected, and a fixed amount rotation is executed according to the detected rotational force. In an example of FIG. 15, in a time t3 and a time t8, the fixed amount rotation by the second control mode is executed. When the fixed amount rotation is executed, the process proceeds to step S232, and after the count value Mc of the counter 274 increases, the process proceeds to step S215.

In step S212, when the rotational force is not detected, the process proceeds to step S213, and whether or not the translational force is detected is determined. This determination is determination on whether or not the determination value Fb of the comparator 271 of the translational force is 1. When the translational force is detected, the process proceeds to step S241, the second control mode is selected, and fixed amount translation is executed according to the detected translational force. In an example of FIG. 15, in a period of times t1, t2, and t4 and times t5 to t6, the fixed amount translation by the second control mode is executed. When the fixed amount translation is executed, the process proceeds to step S242, and after the count value Fc of the counter 273 increases, the process proceeds to step S215.

In step S213, when the translational force is not detected, the process proceeds to step S214, and after the count values Fc and Mc of the counters 273 and 273 are reset to zero, the process proceeds to step S215. In step S215, whether or not the teaching processing is terminated is determined, and when the teaching processing is not completed, the process proceeds to step S211.

In an example of FIG. 15, in a time t3 and a time t8, both the translational force and the rotational force are detected, and in response to this, the fixed amount rotation in the second control mode is executed. That is, in this example, a method in which movement according to the translational force is not performed and rotation by a predetermined rotation amount is performed about an axis on which the rotational force is detected is adopted as a moving method when the translational force and the rotational force are simultaneously detected. The moving method corresponds to an option C1 described in the first embodiment. Instead, the option C2 may be used.

Further, in the example of FIG. 15, although the translational force F is continuously detected from the time t5 to t6, the fixed amount movement by the second control mode is performed four times until the count value Fc of the translational force counter 273 reaches a threshold (=5), and the continuous movement by the first control mode is executed after the time t6 when the count value Fc reaches the threshold. A time until the count value Fc reaches the threshold is equal to the continuous time threshold Tth shown in FIG. 9. That is, similarly to the first embodiment, even in the fourth embodiment, when the continuous time during which the magnitude of the force F is equal to or more than the force threshold Fth is less than the continuous time threshold, the second control mode is selected, and when the continuous time is equal to or more than the continuous time threshold, the first control mode is selected. However, as described in FIG. 9, in the first embodiment, in a period from a time when the magnitude of the force F is equal to or more than the force threshold Fth to a time when the continuous time threshold Tth elapses, the fixed amount movement by the second control mode is not executed. Meanwhile, as illustrated in FIG. 15, in the fourth embodiment, in a period from a time when the magnitude of the force F is equal to or more than the force threshold Fth to a time when the continuous time threshold elapses (that is, a period until the count value reaches a threshold), the fixed amount movement by the second control mode is executed. Even in either case, it is common that the first control mode or the second control mode is selected according to the temporal change in the force detected by the force detecting unit 190. Thus, according to the temporal change in the force applied to the movable unit of the robot 100 by the user, the control mode can be easily switched.

E. Fifth Embodiment

Figure 16:
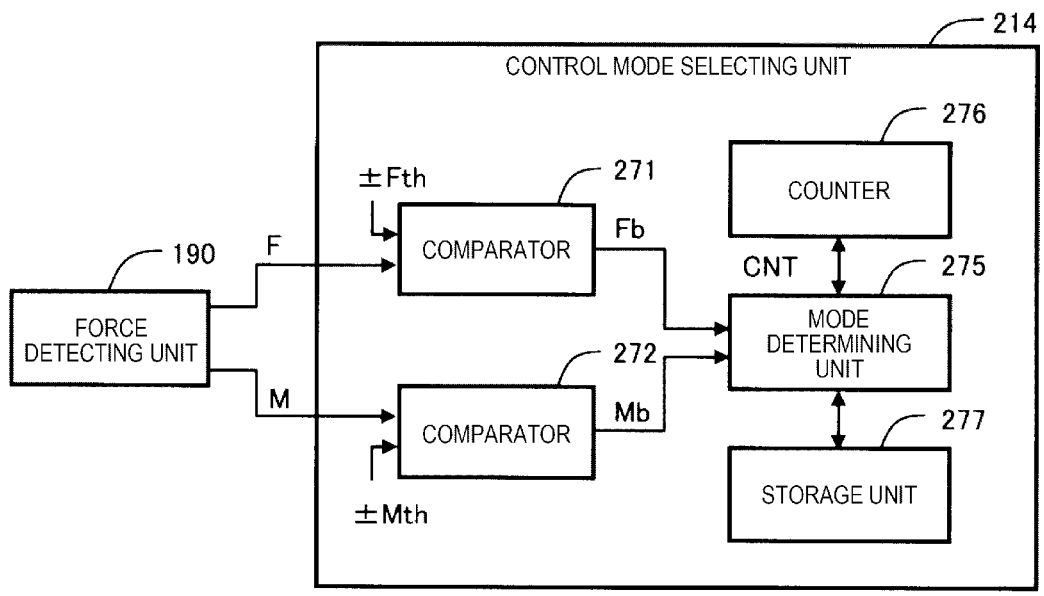
FIG. 16 is a functional block diagram illustrating a control mode selecting unit according to a fifth embodiment.

FIG. 16 is a functional block diagram illustrating a control mode selecting unit 214 according to a fifth embodiment. In the fifth embodiment, the overall configuration of the robot system is the same as that of the first embodiment and the fourth embodiment, and the configuration of the control mode selecting unit 214 and the processing procedure of the teaching processing are different from those of the first embodiment and the fourth embodiment.

The control mode selecting unit 214 has two comparators 271 and 272, a mode determining unit 275, a counter 276, and a storage unit 277. The control mode selecting unit 214 according to the fifth embodiment has a configuration in which the counters 273 and 274 are omitted and the counter 276 and the storage unit 277 are added, as compared to the control mode selecting unit 214 illustrated in FIG. 13 according to the fourth embodiment. The comparators 271 and 272 differ from those according to the fourth embodiment in that the determination values Fb and Mb of three values (−1, 0, +1) are generated using both plus thresholds +Fth and +Mth and minus thresholds −Fth and −Mth as thresholds. The plus force threshold +Fth of the translational force F means a force threshold in a forward direction (for example, in +X direction), and the minus force threshold −Fth means a force threshold in a reverse direction (for example, in −X direction). The plus and minus force threshold ±Fth is used to determine a direction of the translational force F. In this case, "whether the magnitude of the force is equal to or more than a force threshold" is determined by comparing the force F with an absolute value of the force threshold ±Fth. The rotational force M is the same.

The determination values Fb and Mb of the three values of the two comparators 271 and 272 are input to the mode determining unit 275. The mode determining unit 275 stores the two determination values Fb and Mb in the storage unit 277, and executes determination on whether either the first control mode or the second control mode is selected with reference to a history of the determination values Fb and Mb recorded in the storage unit 277. The counter 276 is used to determine a processing period by the mode determining unit 275.

Figure 17:
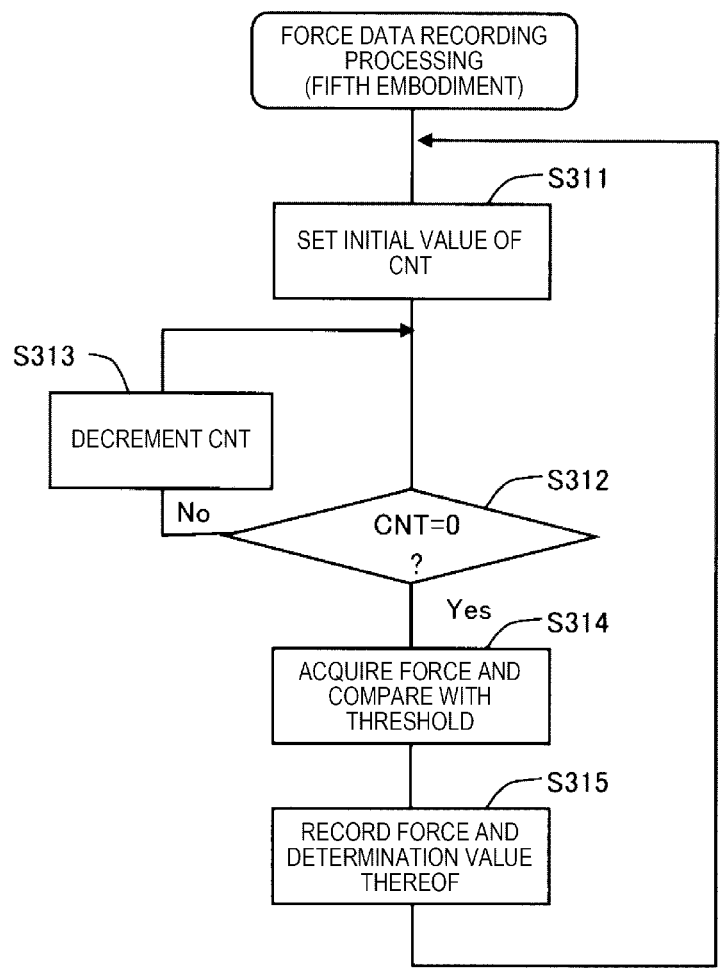
FIG. 17 is a flowchart illustrating force data recording processing according to the fifth embodiment.

FIG. 17 is a flowchart illustrating force data recording processing according to the fifth embodiment. This process is executed by the mode determining unit 275. In step S311, the count value CNT of the counter 276 is set to an initial value that is not zero. In step S312, whether or not the count value CNT is zero is determined. When the count value CNT is not zero, the process proceeds to step S313, the count value CNT is decreased by 1, and the process returns to step S312. In step S312, when the count value CNT reaches zero, the process proceeds to step S314. In step S314, the comparators 271 and 272 acquire the forces F and M from the force detecting unit 190, and compare the forces F and M with the force thresholds ±Fth and ±Mth. In step S315, the mode determining unit 275 stores the determination values Fb and Mb of the comparators 271 and 272 in the storage unit 277, and the process returns to step S311. In this way, in the processing of FIG. 17, for each constant period corresponding to an initial value of the count value CNT, processing of steps S314 and S315 is repeatedly executed.

Figure 18:
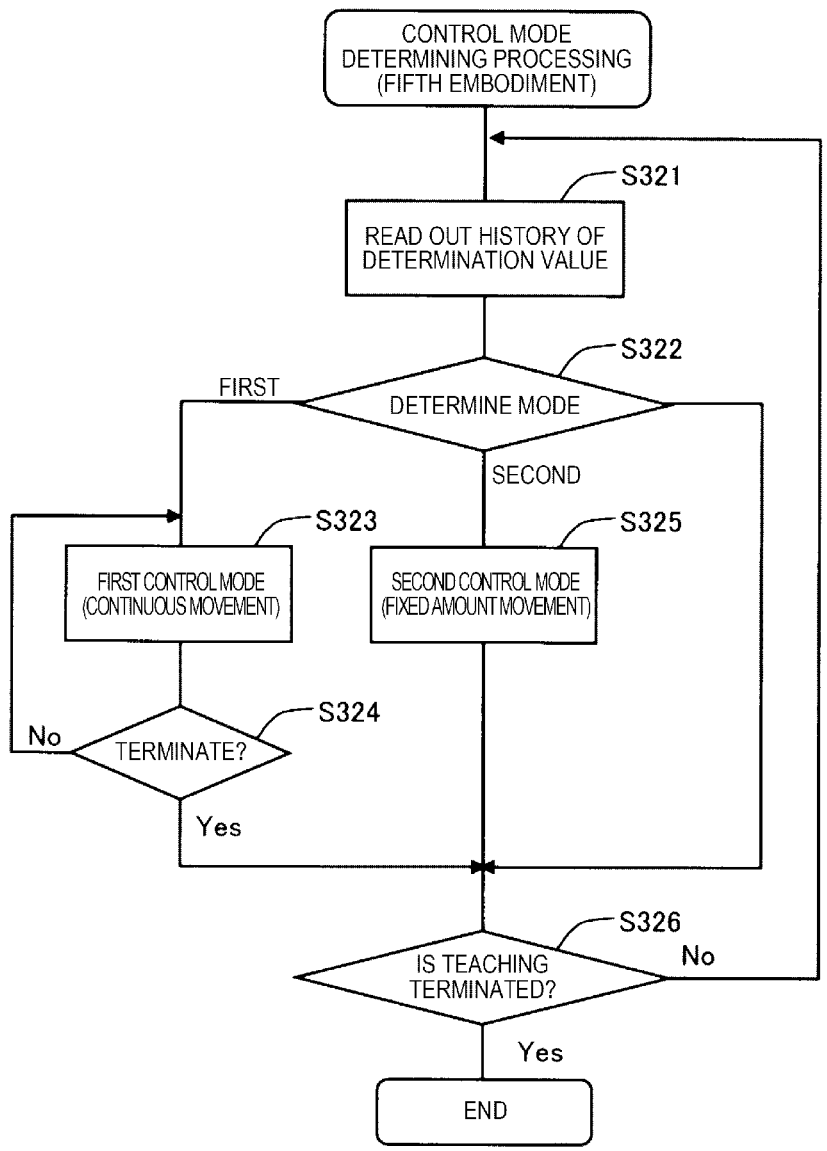
FIG. 18 is a flowchart illustrating control mode determining processing according to the fifth embodiment.
Figure 19:
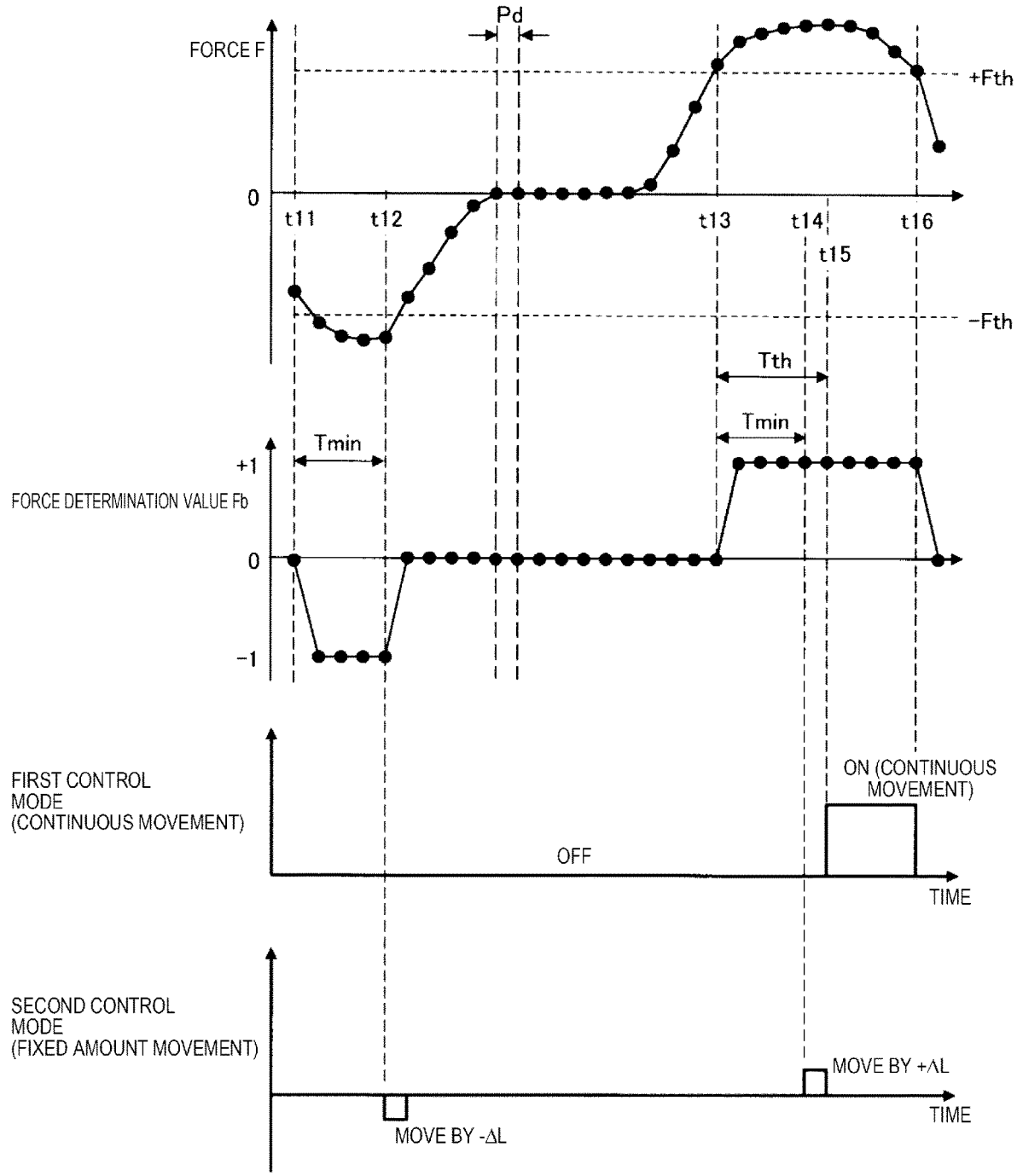
FIG. 19 is a timing chart illustrating the selection example of the first control mode and the second control mode according to the fifth embodiment.

FIG. 18 is a flowchart illustrating control mode determining processing according to the fifth embodiment, and FIG. 19 is a timing chart thereof. This process is also executed by the mode determining unit 275. Similarly to the processing of FIG. 17, processing of FIG. 18 is also executed at each constant period corresponding to the initial value of the count value CNT. However, illustration of the processing of the count value CNT is omitted. In FIG. 19, the force F, the determination value Fb, and execution states of the first control mode and the second control mode are drawn. A black circle of FIG. 19 indicates points plotted for each constant period Pd. The period Pd is set to a range of, for example, 10 ms to 30 ms. The rotational force is not illustrated.

The mode determining unit 275 reads out a history of the determination values Fb and Mb from the storage unit 277 in step S321 of FIG. 18 and executes determination and selection of the control mode in step S322. For example, when the continuous time during which the determination value Fb of the translational force continues at +1 or −1 is equal to or more than the continuous time threshold Tth, the first control mode is selected, the process proceeds to step S323, and the continuous movement is executed. The first control mode continues until the determination value Fb becomes zero in step S324. Meanwhile, in step S322, when the continuous time during which the determination value Fb continues at +1 or −1 is less than the continuous time threshold Tth and is equal to or more than a minimum time threshold Tmin, the second control mode is selected, the process proceeds to step S325, and the fixed amount movement is executed. Further, in step S322, when the continuous time during which the determination value Fb continues at +1 or −1 is less than the minimum time threshold Tmin, neither the first control mode nor the second control mode is selected, and the process proceeds to step S326. These processes are also applied to the rotational force. In step S326, whether or not the teaching processing is terminated is determined, and when the teaching processing is not completed, the process returns to step S321.

In the example of FIG. 19, in the period of times t11 to t12, the determination value Fb continues at −1. At the time t12, since the continuous time reaches the minimum time threshold Tmin, the second control mode is selected, and the fixed amount movement is executed. Further, similarly to the period of times t13 to t14, the determination value Fb continues at +1. At the time t14, since the continuous time reaches the minimum time threshold Tmin, the second control mode is selected, and the fixed amount movement is executed. However, in the fixed amount movement at the time t12 and the fixed amount movement at the time t14, directions of the force F are opposite to each other. Thus, the fixed amount movement is also performed in an opposite direction. In time t15 when one period Pd has passed from time t14, since the continuous time during which the determination value Fb continues at +1 reaches the continuous time threshold Tth, the first control mode is selected, and the continuous movement has started until time t16.

In this way, even in the fifth embodiment, the first control mode or the second control mode is selected depending on the temporal change in the force detected by the force detecting unit 190. Thus, according to the temporal change in the force applied to the movable unit of the robot 100 by the user, the control mode can be easily switched.

Figure 20:
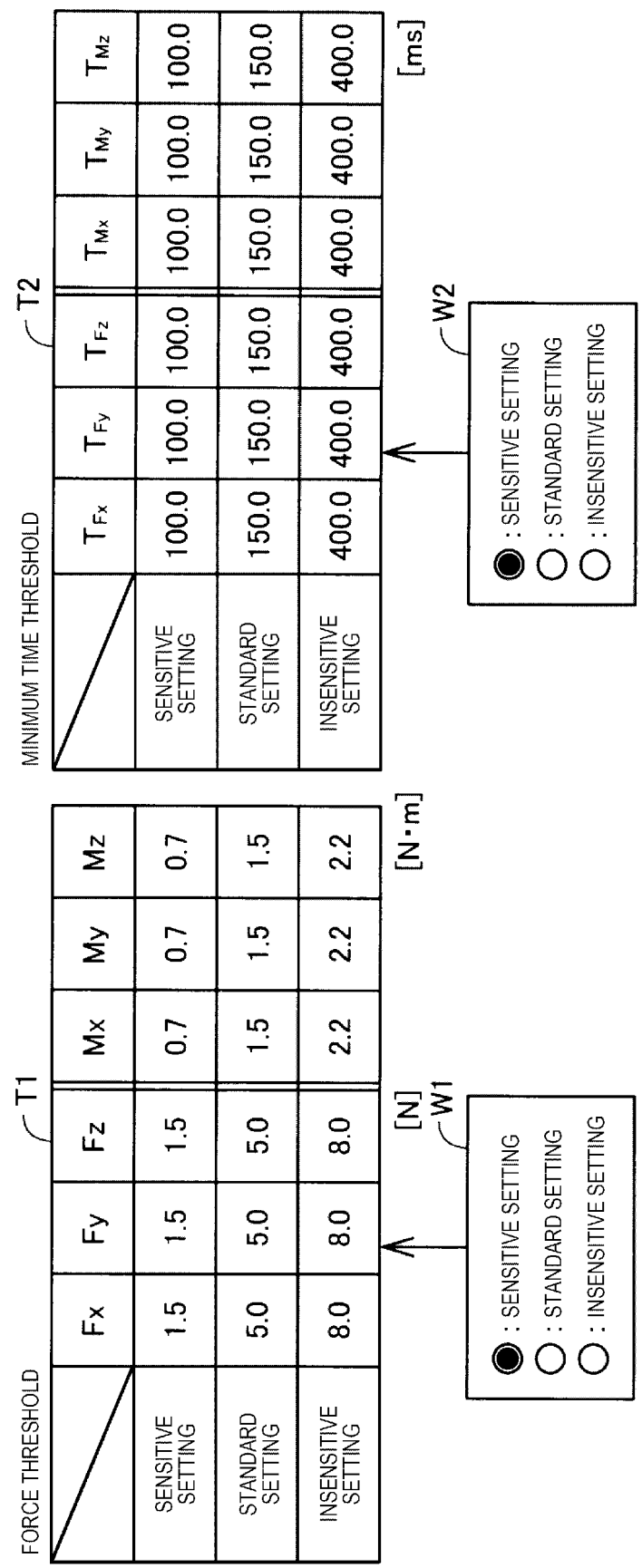
FIG. 20 is a diagram for illustrating an example of a threshold setting screen.

FIG. 20 is a diagram for illustrating an example of a threshold setting screen used in the fifth embodiment. In this example, an example of a first window W1 for setting the force thresholds Fth and Mth used in the comparators 271 and 272 in FIG. 16 and a second window W2 for setting the minimum time threshold Tmin illustrated in FIG. 19 is illustrated. A plurality of options are displayed in each of the two windows W1 and W2. The plurality of options include "sensitive setting", "standard setting", and "insensitive setting". When the user selects one of a plurality of options in each of the windows W1 and W2, input is received by the input receiving unit 216, and in response to this, thresholds illustrated in tables T1 and T2 are set.

In the first table T1, force thresholds in the six-axis directions are respectively set. In the "sensitive setting", thresholds Fx, Fy, and Fz of the translational force are set to 1.5 N, and thresholds Mx, My, and Mz of the rotational force are set to 0.7 N·m. In the "standard setting", the threshold Fx, Fy, and Fz of the translational force are set to 5.0 N, and the threshold Mx, My, and Mz of the rotational force are set to 1.5 N·m. In the "insensitive setting", the threshold Fx, Fy, and Fz of the translational force are set to 8.0 N, and the thresholds Mx, My, and Mz of the rotational force are set to 2.2 N·m. The force thresholds for the translational force may be set to be equal to or more than 0.5 N and equal to or less than 10 N. Further, the force thresholds for the rotational force may be set to be equal to or more than 0.05 N·m and equal to or less than 3 N·m. These preferred ranges are the same in other embodiments described above.

In the second table T2, minimum time thresholds Tmin for forces in the six-axis directions are respectively set. In the "sensitive setting", all minimum time thresholds $T_{Fx}$, $T_{Fy}$, $T_{Fz}$, $T_{Mx}$, $T_{My}$, and $T_{Mz}$ for forces in the six-axis directions are set to 100 ms. In the "standard setting", all the minimum time thresholds for the forces in the six-axis directions are also set to 150 ms. In the "insensitive setting", all the minimum time thresholds for the forces in the six-axis directions are also set to 400 ms. The minimum time thresholds Tmin may be set to be equal to or more than 50 ms and equal to or less than 500 ms.

In this way, when setting input of the user is received using the windows W1 and W2 which are setting screens including a plurality of options, the user can easily set the thresholds. The continuous time threshold Tth used in FIG. 19 may also be set similarly to the minimum time threshold Tmin. Although it is not necessary to display the tables T1 and T2 on a display unit, the tables T1 and T2 may be displayed on the display unit together with the windows W1 and W2.

Figure 21:
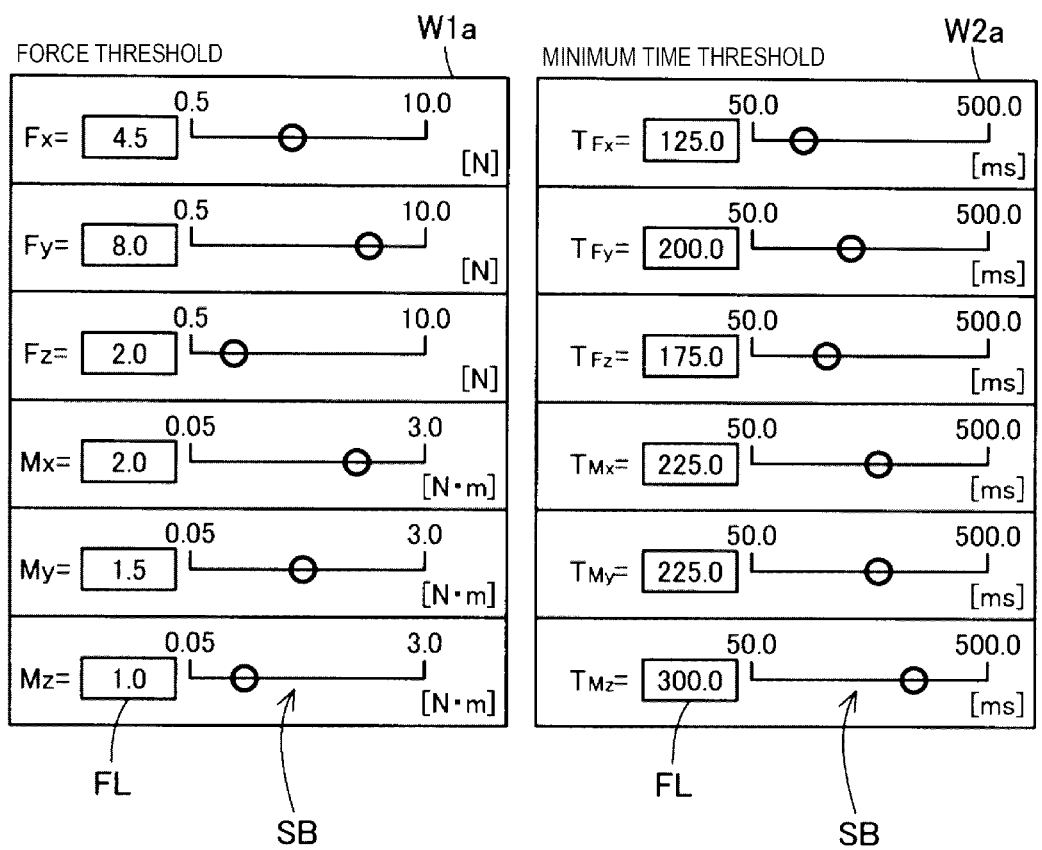
FIG. 21 is a diagram for illustrating another example of the threshold setting screen.

FIG. 21 is a diagram for illustrating another example of a threshold setting screen used in the fifth embodiment. In this example, another example of a first window W1a for setting the thresholds Fth and Mth used in the comparators 271 and 272 in FIG. 16 and a second window W2a for setting the minimum time threshold Tmin illustrated in FIG. 19 is illustrated. Each of the two windows W1a and W2a includes a field FL for inputting or displaying a numerical value and a slide bar SB for selecting a numerical value. When the user sets the value using the slide bar SB, the value is displayed on the field FL. Meanwhile, when the user directly inputs a value into the field FL, the value is reflected on the slide bar SB. In the example of FIG. 21, since the force threshold and the minimum time threshold can be individually set for each of the six axes, there is an advantage in that a more appropriate value can be set compared with the example of FIG. 20. Meanwhile, the example of FIG. 20 has an advantage in that setting is easier than the example of FIG. 21.

Screens illustrated in FIGS. 20 and 21 may be used for inputting and setting various parameters used in the above-described various embodiments. For example, in the setting screen of the teaching processing, the user may set the movement amount in the second control mode in an optional manner. In this way, when the user inputs a parameter including a force threshold as a parameter used for selecting and executing the first control mode or the second control mode, it is possible to select and execute the control mode using the user's favorite parameters.

As described above, in the fifth embodiment, the first control mode or the second control mode is selected according to a length of a period during which the magnitude of the force is equal to or more than the force threshold. Thus, according to the temporal change in the force applied to the movable unit of the robot 100 by the user, the control mode can be easily switched. Further, particularly in the fifth embodiment, until the continuous time during which the magnitude of the force is equal to or more than the force threshold reaches the minimum time threshold Tmin, the second control mode is not selected. After the continuous time reaches the minimum time threshold Tmin, the second control mode is selected. In this way, since the second control mode is not selected when an unstable force such as chattering occurs, there is an advantage in that control by the second control mode can be correctly executed.

F. Another Embodiment

The present disclosure is not limited to the above-described embodiment, and can be realized in various forms without departing from the gist thereof. For example, the present disclosure can also be realized by the following aspects. Technical features in the above embodiments corresponding to technical features in each embodiment described below may be appropriately replaced or combined in order to solve some or all of the problems of the present disclosure or achieve some or all of the effects of the present disclosure. Further, unless these technical features are described as essential in the specification, the technical features may be appropriately deleted.

(1) A first embodiment of the present disclosure provides a control device that controls a robot including a movable unit and a force detecting unit that detects a force applied to the movable unit. The control device includes a controller that controls the movable unit in the first control mode in which the movable unit continuously moves according to the force detected by the force detecting unit and in the second control mode in which the movable unit moves by a predetermined movement amount according to the force detected by the force detecting unit, in the teaching of the robot. The controller selects the first control mode or the second control mode according to one or both of the temporal change in the force detected by the force detecting unit and the magnitude of the force.

According to the control device, the control mode can be easily switched according to one or both of the temporal change in the force detected by the force detecting unit and the magnitude of the force.

(2) In the control device, the controller may select the first control mode or the second control mode according to the length of the time during which the magnitude of the force is equal to or more than the force threshold.

According to the control device, the user can easily switch the control mode according to the temporal change in the force applied to the movable unit.

(3) In the control device, the controller may select the second control mode when the continuous time during which the magnitude of the force is equal to or more than the force threshold is more than zero and less than the continuous time threshold, and may select the first control mode when the continuous time is equal to or more than the continuous time threshold.

According to the control device, the user can easily switch the control mode according to the temporal change in the force applied to the movable unit.

(4) In the control device, the controller may not select the second control mode until the continuous time during which the magnitude of the force is equal to or more than the force threshold reaches the minimum time threshold, and may select the second control mode after the continuous time reaches the minimum time threshold.

According to the control device, since the second control mode is not selected when the unstable force such as the chattering occurs, control by the second control mode can be correctly executed.

(5) In the control device, the minimum time threshold may be set to be equal to or more than 50 ms and equal to or less than 500 ms.

According to the control device, since the second control mode is not selected when the unstable force such as the chattering occurs, the control by the second control mode can be correctly executed.

(6) In the control device, the force threshold includes a first value and a second value larger than the first value. In the second control mode, the controller may move the movable unit by a first movement amount when the magnitude of the force is equal to or more than the first value and is less than the second value, and may move the movable unit by a second movement amount larger than the first movement amount when the magnitude of the force is equal to or more than the second value.

According to the control device, in the second control mode, the user can switch the movement amount of the movable unit according to the magnitude of the force applied to the movable unit.

(7) The control device may include an input receiving unit that receives input of the force threshold from the user.

Since the control device receives input of a parameter including the force threshold from the user, it is possible to select and execute the control mode by using the user's favorite parameters.

(8) In the control device, the controller may select the second control mode when the magnitude of the force is equal to or more than the first value and is less than the second value, and may select the first control mode when the magnitude of the force is equal to or more than the second value.

According to the control device, the user can easily switch the control mode according to the magnitude of the force applied to the movable unit.

(9) A second embodiment of the present disclosure provides a robot system that includes a robot including a movable unit, a force detecting unit that detects a force applied to the movable unit, and the above-described control device.

According to the robot system, the control mode can be easily switched according to one or both of the temporal change in the force detected by the force detecting unit and the magnitude of the force.

The present disclosure can be realized in various forms other than the above-described configuration. For example, a robot system including a robot and a robot controlling device, a computer program for realizing a function of the robot controlling device, a non-transitory recording medium on which the computer program is recorded, and the like can be realized.

What is claimed is:

1. A control device that controls a robot including a movable member and a force detector that detects a force applied to the movable member, the control device comprising:
a memory configured to store a program, a predetermined movement amount of the movable member, a force threshold, and a continuous time threshold; and
a processor configured to execute the program so as to perform a teaching mode, in the teaching mode, the processor being configured to:
cause the force detector to detect a force value of the force when the force is applied to the movable member along a force application direction, the force being generated due to one of moving, pushing, pulling, or twisting of the movable member by an operator;
obtain the force value from the force detector;
determine whether the force value is equal to or more than the force threshold while preventing a movement of the movable member even if the force is applied to the movable member;
detect a first period of time during which the processor determines that the force value is continuously equal to or more than the force threshold;
detect a second period of time that elapses from a time at which the processor determines that the force value is equal to or more than the force threshold;
determine whether the detected first period of time is equal to or more than the continuous time threshold;
continuously move the movable member along the force application direction from a first initial stop position as a continuous movement when the processor determines that the force value is equal to or more than the force threshold and the detected first period of time is equal to or more than the continuous time threshold and after the detected second period of time reaches the continuous time threshold;

end the continuous movement of the movable member when the processor determines that the force value is less than the force threshold; and move the movable member along the force application direction by the predetermined movement amount from a second initial stop position as a fixed amount movement when the processor determines that the force value is equal to or more than the force threshold and the detected first period of time is less than the continuous time threshold and after the detected second period of time reaches the continuous time threshold.

2. The control device according to claim 1, wherein the force threshold includes a first value and a second value larger than the first value, and in the fixed amount movement, the processor is configured to move the movable member by a first movement amount when the force value is equal to or more than the first value and is less than the second value, and the processor is configured to move the movable member by a second movement amount larger than the first movement amount when the force value is equal to or more than the second value.

3. The control device according to claim 1, further comprising:

an input receiver configured to receive an input of the force threshold from the operator.

4. A robot system comprising:

a robot including a movable member and a force detector that detects a force applied to the movable member; and a control device, the control device including:
  a memory configured to store a program, a predetermined movement amount of the movable member, a force threshold, and a continuous time threshold; and
  a processor configured to execute the program so as to perform a teaching mode, in the teaching mode, the processor being configured to:
    cause the force detector to detect a force value of the force when the force is applied to the movable member along a force application direction, the force being generated due to one of moving, pushing, pulling, or twisting of the movable member by an operator;
    obtain the force value from the force detector;
    determine whether the force value is equal to or more than the force threshold while preventing a movement of the movable member even if the force is applied to the movable member;
    detect a first period of time during which the processor determines that the force value is continuously equal to or more than the force threshold;
    detect a second period of time that elapses from a time at which the processor determines that the force value is equal to or more than the force threshold;
    determine whether the detected first period of time is equal to or more than the continuous time threshold;
    continuously move the movable member along the force application direction from a first initial stop position as a continuous movement when the processor determines that the force value is equal to or more than the force threshold and the detected first period of time is equal to or more than the continuous time threshold and after the detected second period of time reaches the continuous time threshold;
    end the continuous movement of the movable member when the processor determines that the force value is less than the force threshold; and
    move the movable member along the force application direction by the predetermined movement amount from a second initial stop position as a fixed amount movement when the processor determines that the force value is equal to or more than the force threshold and the detected first period of time is less than the continuous time threshold and after the detected second period of time reaches the continuous time threshold.

5. A control device that controls a robot including a movable member and a force detector that detects a force applied to the movable member, the control device comprising:

a memory configured to store a program, a predetermined movement amount of the movable member, a force threshold, a minimum time threshold, and a continuous time threshold, the minimum time threshold having a smaller value than the continuous time threshold; and a processor configured to execute the program so as to perform a teaching mode, in the teaching mode, the processor being configured to:
  cause the force detector to detect a force value of the force when the force is applied to the movable member along a force application direction, the force being generated due to one of moving, pushing, pulling, or twisting of the movable member by an operator;
  obtain the force value from the force detector;
  determine whether the force value is equal to or more than the force threshold while preventing a movement of the movable member even if the force is applied to the movable member;
  detect a first period of time during which the processor determines that the force value is continuously equal to or more than the force threshold;
  detect a second period of time that elapses from a time at which the processor determines that the force value is equal to or more than the force threshold;
  determine whether the detected first period of time is equal to or more than the minimum time threshold;
  determine whether the detected first period of time is equal to or more than the continuous time threshold;
  continuously move the movable member along the force application direction from a first initial stop position as a continuous movement when the processor determines that the force value is equal to or more than the force threshold and the detected first period of time is equal to or more than the continuous time threshold and after the detected second period of time reaches the continuous time threshold;
  end the continuous movement of the movable member when the processor determines that the force value is less than the force threshold; and
  move the movable member along the force application direction by the predetermined movement amount from a second initial stop position as a fixed amount movement when the processor determines the force value is equal to or more than the force threshold and the detected first period of time is equal to or more than the minimum time threshold and after the detected second period of time reaches the minimum time threshold.

6. The control device according to claim 5, wherein the continuous time threshold is at least 25% more than the minimum time threshold.

7. The control device according to claim 5, wherein the minimum time threshold is in a range of 50 ms to 500 ms.

* * * * *